US006989115B2

(12) United States Patent
Russell et al.

(10) Patent No.: US 6,989,115 B2
(45) Date of Patent: Jan. 24, 2006

(54) METHOD AND APPARATUS FOR PROTOTYPING A THREE-DIMENSIONAL OBJECT

(75) Inventors: David B. Russell, Southboro, MA (US); Walter Henry Zengerle, III, Dedham, MA (US); Peter Charles Conway, Pepperell, MA (US); James F. Bredt, Watertown, MA (US); Benjamin Daniel Sweet-Block, Cambridge, MA (US); Robert Anthony Phillips, Acton, MA (US)

(73) Assignee: Z Corporation, Burlingon, MA (US)

( * ) Notice: Subject to any disclaimer, the term of this patent is extended or adjusted under 35 U.S.C. 154(b) by 525 days.

(21) Appl. No.: 09/851,502

(22) Filed: May 8, 2001

(65) Prior Publication Data

US 2002/0079601 A1 Jun. 27, 2002

Related U.S. Application Data

(63) Continuation-in-part of application No. 09/416,787, filed on Oct. 13, 1999, now Pat. No. 6,375,874, which is a continuation-in-part of application No. 08/771,009, filed on Dec. 20, 1996, now Pat. No. 6,007,318.

(51) Int. Cl.
  *B29C 31/04* (2006.01)

(52) U.S. Cl. .......................... 264/39; 264/40.1; 264/109; 264/113; 264/308; 425/130

(58) Field of Classification Search ................ 502/248, 502/255, 211, 306, 308, 311, 312, 317, 321–323, 502/415, 439, 104, 110, 113, 117; 264/39, 264/40.1, 109, 308, 113; 425/130
See application file for complete search history.

(56) References Cited

U.S. PATENT DOCUMENTS

| 2,775,758 A | 12/1956 | Munz | 343/17 |
| 3,428,503 A | 2/1969 | Beckerle | 156/11 |
| 4,247,508 A | 1/1981 | Housholder | 264/219 |
| 4,863,538 A | 9/1989 | Deckard | 156/62.2 |
| 4,938,816 A | 7/1990 | Beaman et al. | 156/62.2 |

(Continued)

FOREIGN PATENT DOCUMENTS

| DE | 3713794 A1 | 11/1988 |
| DE | 4417083 A1 | 11/1995 |
| EP | 289 116 A1 | 11/1988 |
| EP | 0 426 363 A2 | 5/1991 |
| EP | 0431924 A2 | 6/1991 |

(Continued)

OTHER PUBLICATIONS

The University of Texas., "Solid Freeform Fabrication Proceedings" Harris L. Marcus, et al., pp. 94–101, ( Sep., 1993).
The University of Texas., "Solid Freeform Fabrication Proceedings" Harris L. Marcus, et al., pp. 51–58, (Sep., 1993).
DTM Corporation., "The Sinterstation ™ 2000 System Selective Laser Sintering User's Guide" (DTM Corporation, Nov. 1993).
Benjamin M. Wu., et al.,"Solid Free–Form Fabrication of Drug Delivery Devices", Journal of Controlled Release 40 (1996) 77–87.

(Continued)

Primary Examiner—Mary Lynn Theisen
(74) Attorney, Agent, or Firm—Goodwin Procter LLP

(57) ABSTRACT

A three-dimensional printer includes multiple printheads for printing binder and/or colorant onto a bed of build material in a build chamber. The printheads can be mounted on a gantry that is designed for reciprocal displacement across a build chamber along a slow axis. The printheads, in turn, can reciprocally move across the gantry on a fast axis to enable displacement of the printheads along both the fast and slow axes so that the printheads can deposit binder liquid and/or colorant across the surface of a bed of build material in the build chamber.

143 Claims, 21 Drawing Sheets

U.S. PATENT DOCUMENTS

| | | | |
|---|---|---|---|
| 4,944,817 A | 7/1990 | Bourell et al. | 156/62.2 |
| 5,015,312 A | 5/1991 | Kinzie | |
| 5,017,753 A | 5/1991 | Deckard | 219/121.63 |
| 5,053,090 A | 10/1991 | Beaman et al. | 156/62.2 |
| 5,059,266 A | 10/1991 | Yamane et al. | |
| 5,076,869 A | 12/1991 | Bourell et al. | 156/62.2 |
| 5,088,047 A | 2/1992 | Bynum | 364/474.24 |
| 5,127,037 A | 6/1992 | Bynum | 378/4 |
| 5,132,143 A | 7/1992 | Deckard | 427/197 |
| 5,155,321 A | 10/1992 | Grube et al. | 219/121.6 |
| 5,155,324 A | 10/1992 | Deckard et al. | 219/121.64 |
| 5,204,055 A | 4/1993 | Sachs et al. | 419/2 |
| 5,252,264 A | 10/1993 | Forderhase et al. | 264/22 |
| 5,260,009 A | 11/1993 | Penn | |
| 5,296,062 A | 3/1994 | Bourell et al. | 156/62.2 |
| 5,316,580 A | 5/1994 | Deckard | 118/110 |
| 5,340,656 A | 8/1994 | Sachs et al. | 428/546 |
| 5,342,919 A | 8/1994 | Dickens, Jr. et al. | 528/323 |
| 5,352,405 A | 10/1994 | Beaman et al. | 419/45 |
| 5,382,308 A | 1/1995 | Bourell et al. | 156/62.2 |
| 5,387,380 A | 2/1995 | Cima et al. | 264/69 |
| 5,490,882 A | 2/1996 | Sachs et al. | 134/1 |
| 6,007,318 A * | 12/1999 | Russell et al. | 425/130 |
| 6,136,252 A | 10/2000 | Bedal et al. | 264/308 |
| 6,146,567 A | 11/2000 | Sachs et al. | 264/113 |
| 6,375,874 B1 * | 4/2002 | Russell et al. | 264/28 |
| 6,612,824 B2 * | 9/2003 | Tochimoto et al. | 425/130 |

FOREIGN PATENT DOCUMENTS

| | | |
|---|---|---|
| EP | 949 993 B1 | 11/2002 |
| WO | WO 92/08592 | 5/1992 |
| WO | WO 93/08928 | 5/1993 |
| WO | WO 94/19112 | 9/1994 |
| WO | WO 94/26446 | 11/1994 |
| WO | WO 95/34468 | 12/1995 |
| WO | WO 97/28955 | 8/1997 |

OTHER PUBLICATIONS

Dubbel "Taschenbuch Für Den Maschinenbau" W. Beitz und K.-H. Küttner.

Sanders Prototype, Inc., MODELMAKER II System, The high precision 3D modeling system (http://www.sanders-prototype.com/mmii/mmii.htm) (consisting of 8 pages).

Sanders Prototype, Inc., Sanders Prototype "MM–6PRO" System (http://www.sanders–prototype.com/mm6pro.htm) (consisting of 4 pages).

U.S. Appl. No. 08/707,693, filed Sep. 4, 1996, Bredt et al.

Technology International Incorporated of Virginia, SBIR 95–1 Solicitation Project Summary (http:/sbir.gsfc.nasa.gov/95abstracts/08.07/951020.html) (consisting of 1 page).

Sanders Prototype, Inc., Model–Maker Desktop 3D Modeling System (http://www.sanders–prototype.com/datasht.htm) (consisting of 4 pages).

Sanders Prototype, Inc., SPI Model Maker™ 3D Modeling System Technical Description (http://www.sanders–prototype.com/techdesc.htm) (consisting of 3 pages).

Sanders Prototype Inc., Sanders Prototype Incorporated Application Notes, (http://www.sanders–prototype.com/appnotes.htm) (consisting of 2 pages).

* cited by examiner

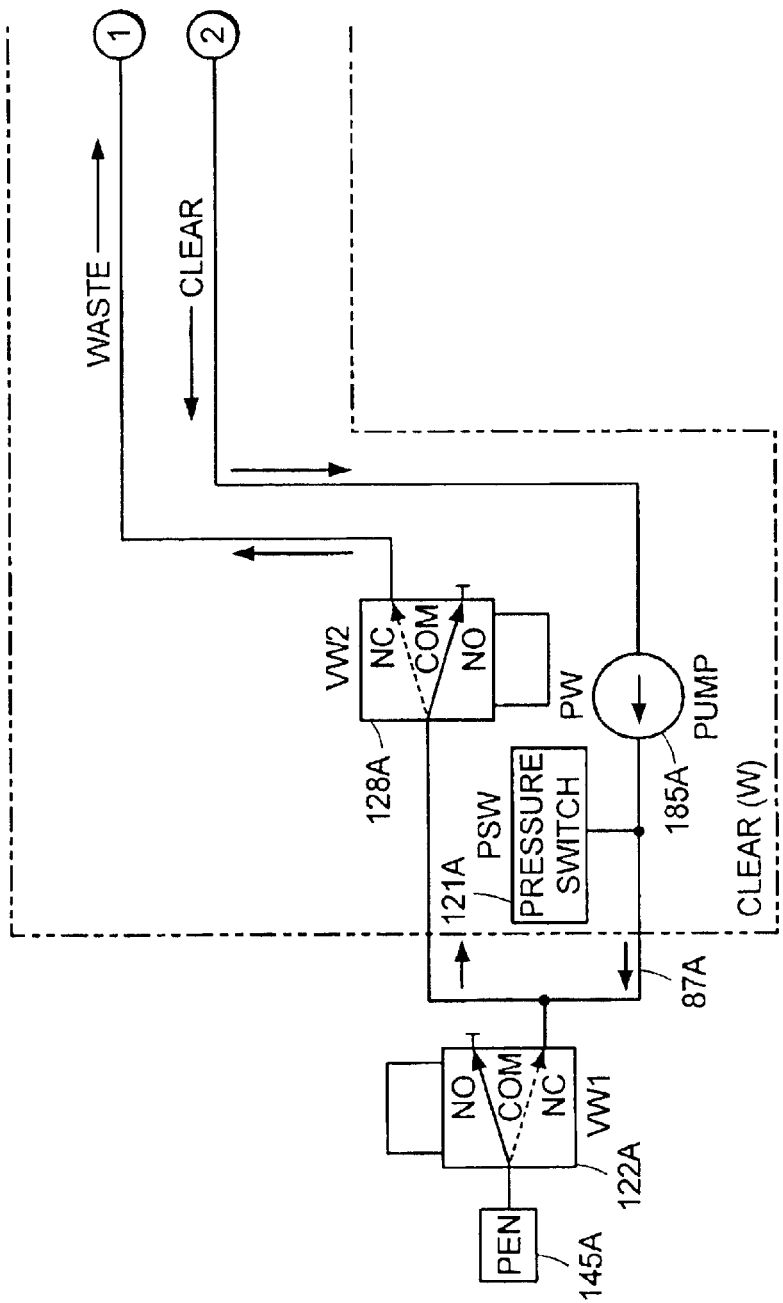

METHOD AND APPARATUS FOR PROTOTYPING A THREE-DIMENSIONAL OBJECT

RELATED APPLICATIONS

This application is a Continuation-in-Part of U.S. application Ser. No. 09/416,787, filed Oct. 13, 1999, now U.S. Pat. No. 6,375,874, which is a Continuation-in-Part of U.S. application Ser. No. 08/771,009, filed Dec. 20, 1996, now U.S. Pat. No. 6,007,318, the entire teachings of both of which are incorporated herein by reference.

BACKGROUND OF THE INVENTION

Rapid prototyping describes various techniques for fabricating a three-dimensional prototype of an object from a computer model of the object. One technique is three-dimensional printing whereby a special printer is used to fabricate the prototype from a plurality of two-dimensional layers. In particular, a digital representation of a 3-D object is stored in a computer memory. Computer software sections the representation of the object into a plurality of distinct 2-D layers. A 3-D printer then fabricates a layer of material for each layer sectioned by the software. Together, the various fabricated layers form the desired prototype.

In one method of three-dimensional printing, layers of a powder material are deposited in a confined area. A binder solution is selectively deposited on each layer to produce regions of bound powder. The unbound powder is then removed to yield a three-dimensional part.

SUMMARY

A system is provided for fabricating a three-dimensional object from a substance, such as a powdered build material. A second material, such as a liquid binder material, can be used to bind the build material at particular locations to form the three-dimensional object.

In accordance with one aspect of this invention, a three-dimensional printer includes multiple printheads for printing a binder liquid, which can include a binder that has been mixed with a colorant to form a colored binder liquid, onto a bed of build material in a build chamber. The printheads can be mounted on a gantry that is designed for reciprocal displacement across a build chamber along a slow axis. The printheads, in turn, can reciprocally move across the gantry on a fast axis to enable displacement of the printheads along both the fast and slow axes so that the printheads can deposit binder liquid, which can be colored, across the surface of a bed of build material in the build chamber.

After each pass of the printheads across the bed along the fast axis, the printheads can be advanced a step along the slow axis and then passed again across the bed along the fast axis. This process can be repeated until an entire layer is printed on the bed of build material. An additional layer of build material can then be deposited via the same process.

The printheads can be offset from one another on the gantry in the direction of the slow axis. With this configuration, the printheads can print adjacent or overlapping lines across the bed of build material when the printheads are passed across the bed along the fast axis, thereby printing a broader swath of binder liquid, including colored binder liquid, onto the bed with each pass of the printheads across the bed. Each of the printheads can print binder liquid alone or binder liquid mixed with colorant.

The system for fabricating a three-dimensional object can be used to form colored objects. Further, multiple printheads can be used to print binder liquid onto the build material.

In accordance with another aspect, the printheads can respectively be coupled with multiple external binder sources. For example, each of at least three printheads can be coupled with a different colorant having one of the three primary colors (cyan, yellow, and magenta) or black. An external binder-liquid source can also be coupled with each of the printheads and at least one additional printhead can be provided to print binder liquid. The binder liquid supplied by the binder source can be colorless (that is, clear or white). The binder-liquid source and colorant sources can further be configured either to mix the binder liquid and colorants before printing or to alternatively deliver either binder liquid or colorant to the printheads. Further still, the printheads can be aligned in at least two rows, the rows being displaced from one another along the slow axis. Within each row a color printhead (coupled with a colorant source) can be paired with a colorless printhead (coupled with a colorless binder-liquid source).

In accordance with yet another aspect, the conduits connecting the external binder liquid sources to the printheads can include return loops that allow unwanted binder liquid and entrapped air to be easily purged from the system.

The printing process can be governed by software instructions stored on a computer-readable memory coupled with a processor, the processor also being coupled with the printheads. The software can include instructions for tapering bands of colored binder liquid printed at an edge of the printed object to leave a section between adjacent bands uncolored to thereby reduce the mixing of colors at edges of the object where bands of different colors meet. The software can further include instructions for printing a higher concentration of colorant at the tapered segments of the bands to thereby provide consistency in color intensity across the surface of the object notwithstanding the thinning of the depth of colorant printing at the edges.

A system for fabricating a colored three-dimensional object is provided that uses a clear binder liquid and a colored binder liquid at a particular location of the object. It is desirable to deposit a predetermined amount of total binder liquid at the particular location to bind the material without over saturating the build material with binder liquid.

A particular system deposits a binder liquid on build material at a particular location in a three-dimensional printer. The system can include determining the total amount of binder liquid needed to solidify the build material at the particular location, determining the amount of each of the colored binder liquids needed to produce the desired color at the particular location and determining the amount of colorless binder liquid that needs to be added to the colored binder liquids to obtain the predetermined total binder liquid requirement. The sum of all the binder liquid amounts to be applied, both colored and colorless, is thereby made to approximately equal a sufficient amount of total binder liquid needed to solidify the build material at the particular location of build material.

A system for drawing or pushing air through a three-dimensional printer is provided for purposes such as holding the object being formed during fabrication to improve the quality of the object.

A further apparatus for fabricating a three-dimensional object includes a feed reservoir having stored therein a supply of build material for forming the object, a build chamber for receiving incremental layers of the build material from the feed reservoir, and a vacuum pump coupled to the feed reservoir and/or to the build chamber to create an airflow through the feed reservoir and/or the build chamber.

A system for cleaning the printheads is also provided. A particular apparatus for fabricating a three-dimensional object can include a structural frame, a build chamber which is supported by the frame and that can be filled with a build material, a gantry mounted for displacement across the build chamber, at least one printhead mounted on the gantry, and at least one cleaning element movable relative to the frame for cleaning the at least one printhead.

A system for reclaiming unused build material is provided such that the build material can be used again thereby eliminating waste. In one embodiment, an apparatus for fabricating a three-dimensional object can include a frame, a build chamber mounted to the frame and suited for being filled with a build material, a chute defining an overflow cavity, the chute being positioned to receive overflow build material from the build chamber, and a removable collection chamber coupled with the chute to receive build material that passes through the chute.

The above and other features including various novel details of construction and combination of parts, will be more particularly described with reference to the accompanying drawings and pointed out in the claims. It will be understood that the particular method and apparatus for prototyping a three-dimensional object embodying the invention is shown by illustration only and not as a limitation of the invention. The principal and features of this invention may be embodied in varied and numerous embodiments without departing from the scope of the invention.

DETAILED DESCRIPTION

Figure 1:
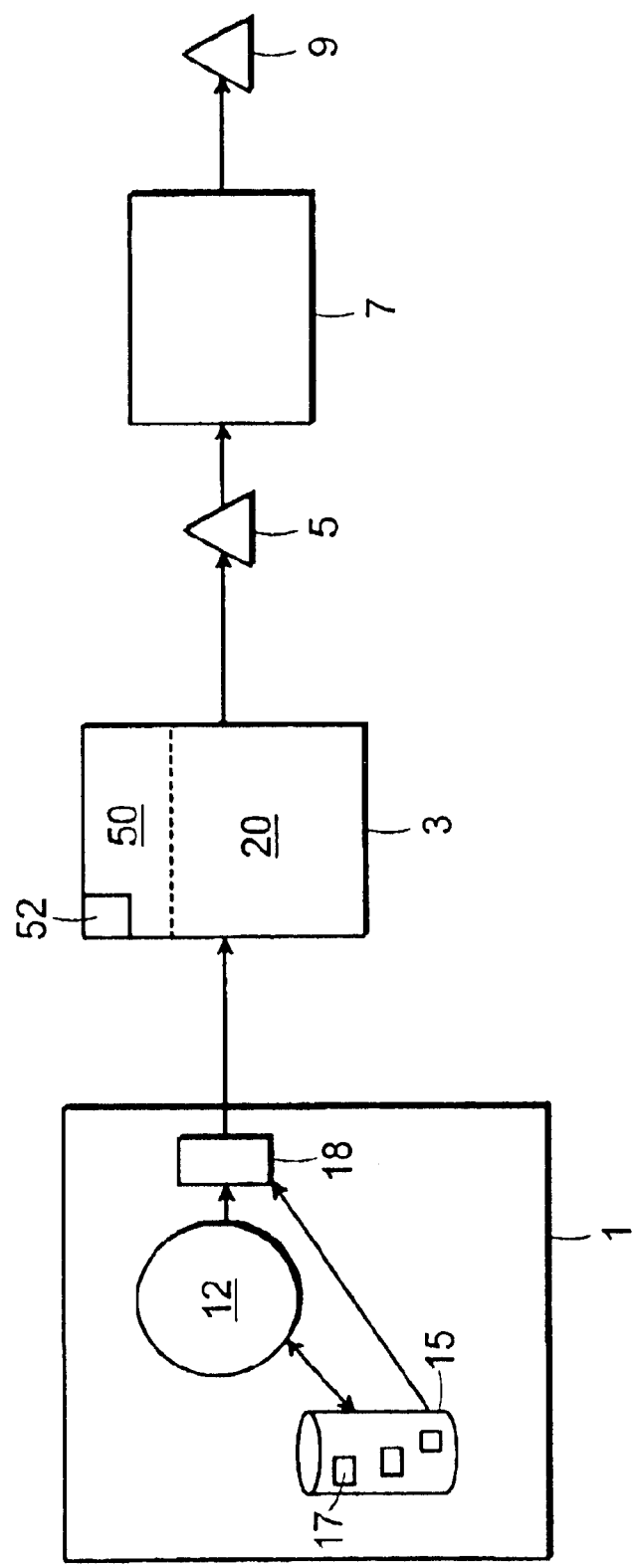
FIG. 1 is a schematic of an apparatus for rapid prototyping.

FIG. 1 is a schematic of a particular apparatus for rapid prototyping. As illustrated, there is a computer 1, a three-dimensional printer 3, a formed 3-D printer object 5, a post-processing system 7, and a post-processes 3-D prototype object 9

The computer 1 can be a personal computer, such as a desktop computer or a portable computer. The computer 1 can be a stand-alone computer or a part of a Local Area Network (LAN) or a Wide Area Network (WAN), including public access communication networks such as the Internet. In accordance with the invention, the computer 1 includes a software application 12, such as a Computer Aided Design (CAD)/Computer Aided Manufacturing (CAM) program. The CAD/CAM program 12 manipulates digital representations of three-dimensional objects 17 stored in a data storage area 15. The CAD/CAM program 12 can create, modify and retrieve the stored representations 17. When a user desires to fabricate a prototype object 9 of the stored object representation 17, the user exports the stored representation to a high-level software program 18. From the high-level program 18, the user then instructs the program 18 to print. The program 18 sections the digital representation 17 into a plurality of discrete two-dimensional layers, each of a predetermined thickness.

The program 18 prints each layer by sending high-level instructions to control electronics 52 in the printer 3, which operates the three-dimensional printer 3. Alternatively, the digital representation of the object 17 can be directly read from a computer-readable medium (e.g., magnetic or optical disk) by printer hardware. The three-dimensional printer 3 includes a dirty area 20 where the printing is performed and a clean area 50 where control electronics 52 are housed.

The three-dimensional printer 3 uses inkjet type printheads to deposit binder onto successive layers of a powdered build material, such as disclosed in U.S. Pat. No. 5,902,441 to Bredt, et al., the teachings of which are incorporated herein by reference in their entirety. Where the binder combines with the build powder, the powder reacts and cures into a solid structure. By controlling the placement of binder droplets from these printheads, the solid structure of the 2-D cross section can be physically reproduced. The three-dimensional printer 3 fabricates a physical layer for each sectioned layer provided by the program 18. When the file has been completely printed, a three-dimensional part 5 has been formed. Further details of binding a powder to form an object are disclosed in U.S. Pat. No. 5,340,656 to Sachs et al., U.S. Pat. No. 5,387,380 to Cima et al., and U.S. application Ser. No. 09/835,292 entitled Compositions for Three-Dimensional Printing of Solid Objects, filed on Apr. 13, 2001, by Bredt et al., the teachings of which are incorporated herein by reference in their entirety.

The post-processing system 7 may be used to improve the prototype object 9 from the printed part 5. Various finishing options are available depending on the result to be achieved.

Those of ordinary skill in the art should recognize that methods involved in prototyping a three-dimensional object may be embodied in a computer program product that includes a computer usable medium. For example, such a computer usable medium can include a readable memory device, such as a solid state memory device, a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

Figure 2:
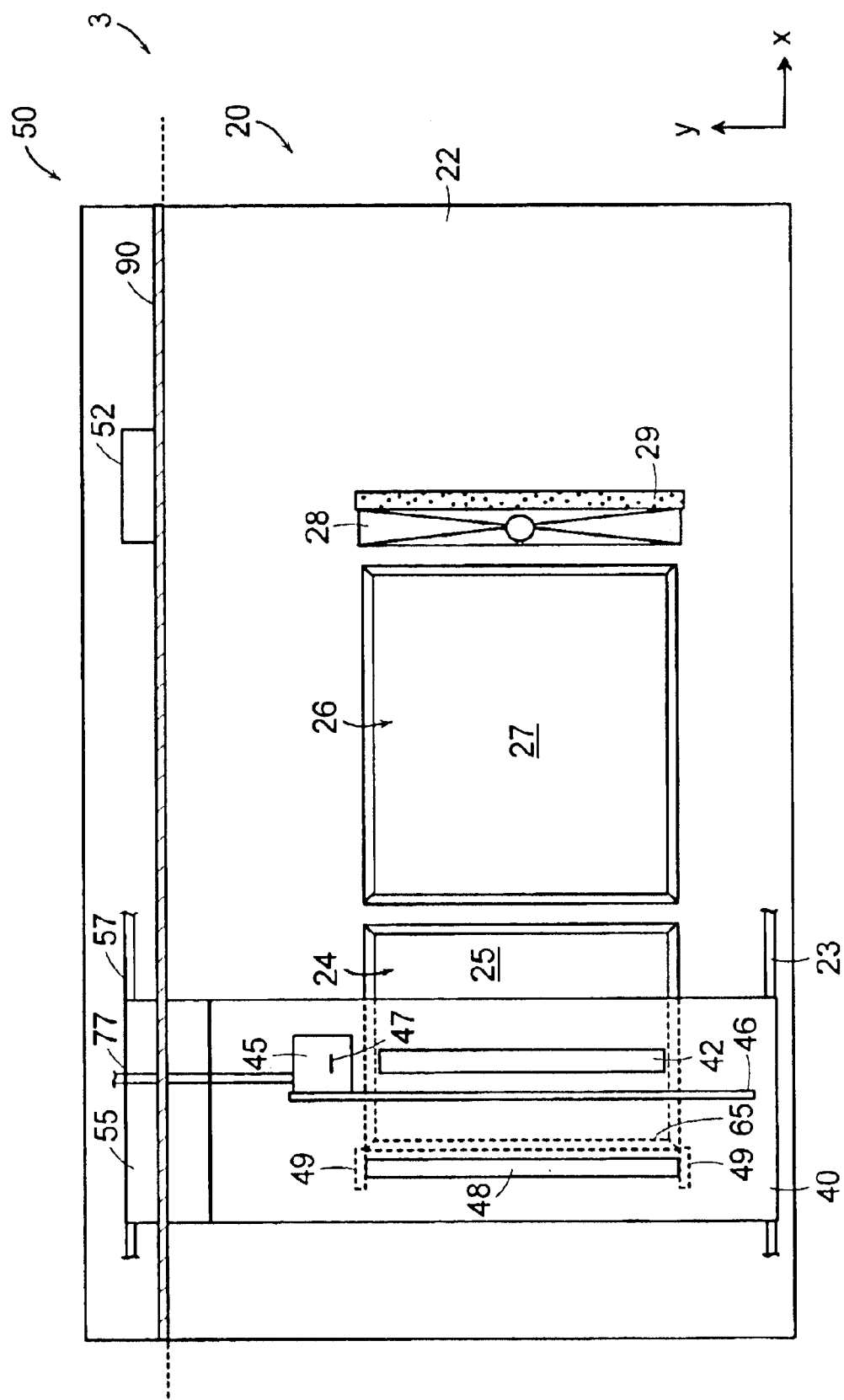
FIG. 2 is a top side view of an embodiment of the three-dimensional printer of FIG. 1.

FIG. 2 is a top schematic view of an embodiment of the three-dimensional printer 3 of FIG. 1. Shown in more detail are the front powdery area 20 and the rear clean area 50. The top deck 22, in addition to the three apertures for chambers 24, 26, 28 includes an abrasive section 29 discussed below. A print gantry 40 is suspended over the top deck 22 by an arm assembly 55 connected to a track 57 and a support rod 23. During operation, the arm moves along the x-axis (slow axis) on the track 57 and the support rod 23 to move the gantry 40.

As illustrated, the gantry 40 carries a printhead 45, which deposits binder liquid. The printhead 45 reciprocates in the y-axis direction along a print track 46. The gantry 40, in one embodiment, includes at least one ink jet printhead 45, having a plurality of binder jets 47 for depositing a binder liquid. The binder jets receive binder solution from a binder conduit 77. Also illustrated is a spreader roller 48 for dispersing build powder from the feed chamber 24 to the build chamber 26.

Airflow

Air can be circulated inside the machine to solve a variety of problems. One specific problem is airborne powder, which can contaminate printer mechanical and electronic components and thereby decrease machine reliability. Also, the powder can accumulate inside the top cover of the machine, thereby reducing the operator's ability to monitor machine operation.

Figure 3A:
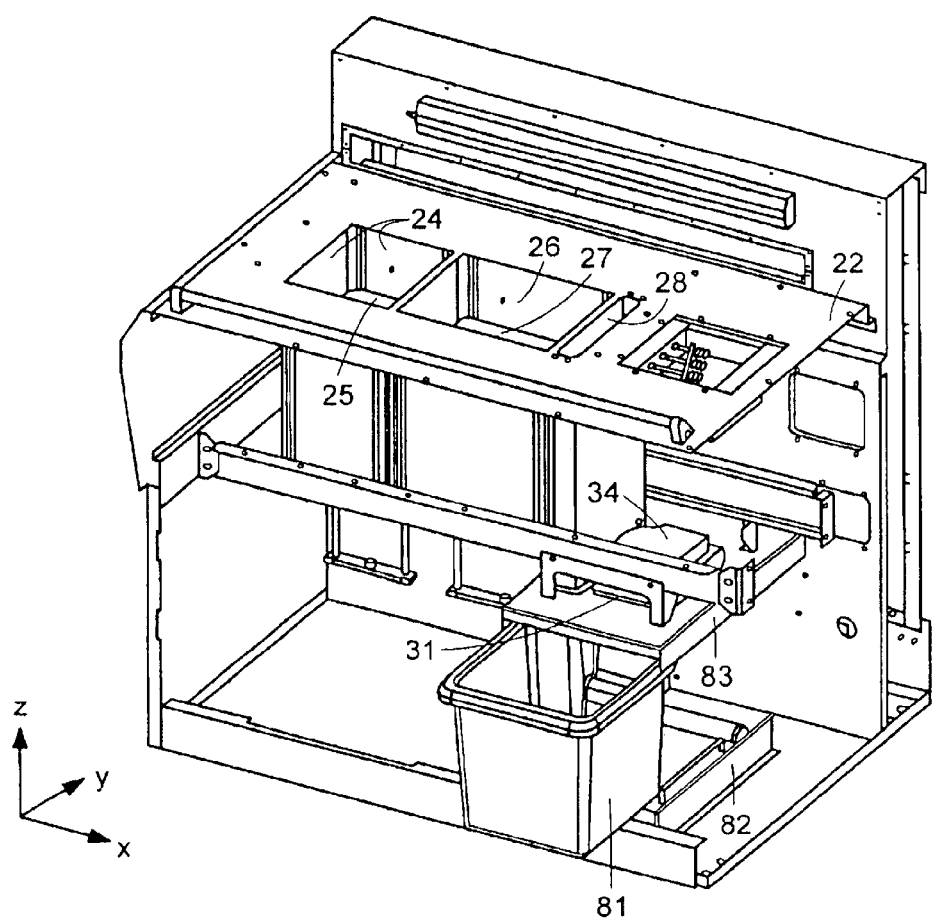
FIG. 3A is a perspective view of the basic elements for regulating and utilizing airflow through an embodiment of the three-dimensional printer of FIG. 1.

FIG. 3A is a perspective view of the basic elements for regulating airflow through an embodiment of the three-dimensional printer 3 of FIG. 1. As illustrated, the three-dimensional printer 3 includes a top deck 22 having a plurality of apertures. The top deck 22 is mounted to a structural frame. Illustrated along the x-axis (slow axis) are a rectangular feed chamber 24 having a feed piston 25, a rectangular build chamber 26 having a build piston defining a build table 27, and an overflow chute 28. Although omitted from the drawing for clarity, seals are fixed to the pistons 25, 27 to slide against the walls of the chambers 24, 26. Although also not illustrated, a top cover isolates the printing area from the outside environment.

FIG. 3A also illustrates elements of a printer designed to facilitate reclaiming spent build material. In this printer, build material that flows into the overflow chute 28 is drawn into a collection bucket 81. The collection bucket 81 slides into a mount 82 on the floor of the printer such that the bucket 81 is positioned to receive build material exiting the bottom of chute 28. A top plate 83 forms a seal over the bucket 81, and a blower 34, mounted on top plate 83, creates a downward draft through the chute 28. A filter 31 is mounted on top plate 83 between the blower 34 and the cavity enclosed by the bucket 81 and the top plate 83. Due to the respective positioning of these elements, overflow build material is collected primarily in the bucket 81 rather than upon the filter 31.

Figure 3B:
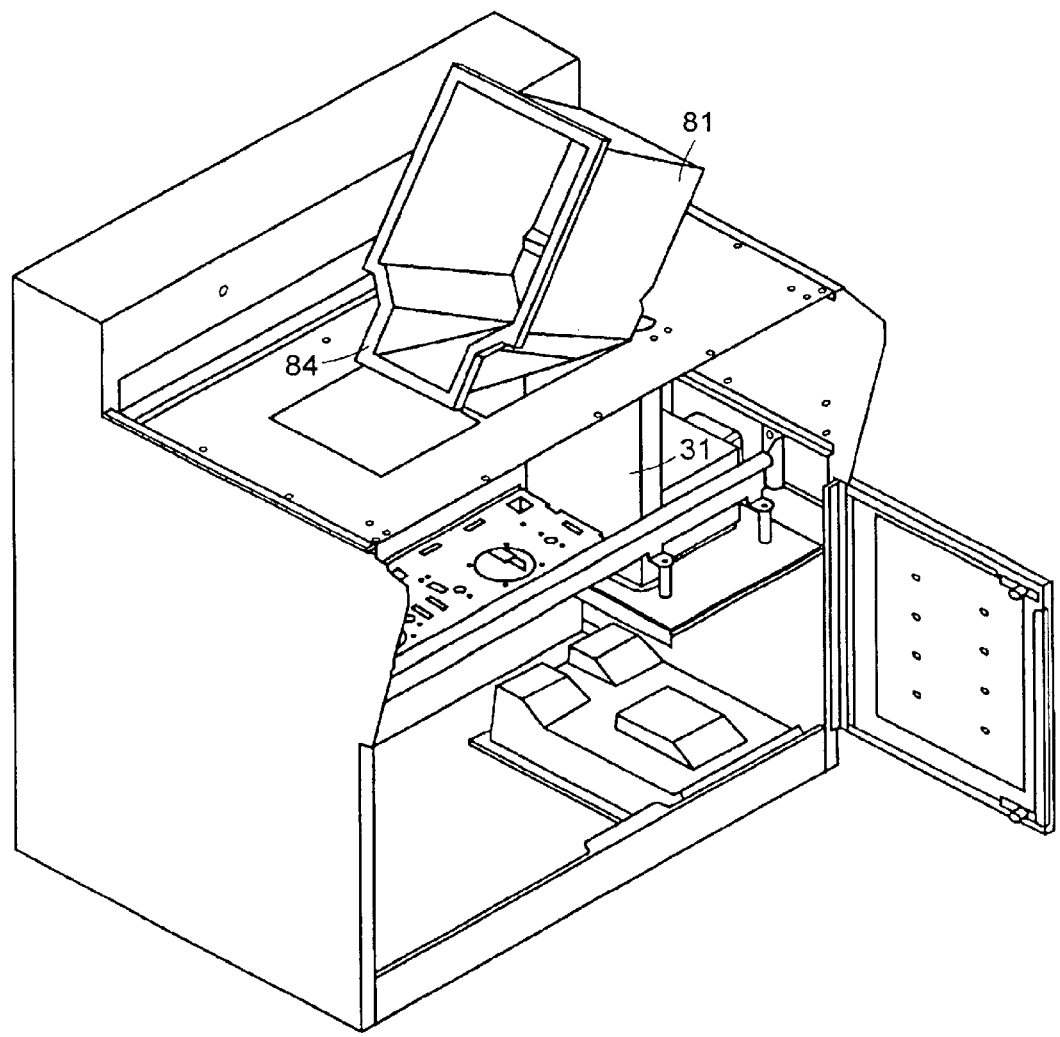
FIG. 3B is a view illustrating the use of a system for reclaiming spent build material.

The build material that falls to the floor of the bucket 81 is more removed from the flow path of the air passing from the chute 28 through the blower 34. The bucket 81 can be easily removed to return the build material back to the feed chamber as illustrated in FIG. 3B. A lip 84 on the bucket 81 further facilitates pouring.

In one embodiment, one or more optical sensors are positioned to sense when the bucket 81 is full. For example, optical sensors can be positioned to sense at a location inside of the bottom end of chute 28. When a "full" reading is made, the bucket 81 is removed and the build material is poured back into the feed chamber, including pouring through a screen to remove any contaminants or clumped material.

In addition to capturing excess powder, the airflow through the overflow chute 28 reduces the amount of airborne powder to enhance machine reliability and user satisfaction.

In alternative embodiments, a vacuum pump can be connected to the feed chamber 24 and/or the build chamber 26 via conduits. It has been found that drawing air from the build material in through the bottom of the feed chamber 24, while the chamber is being filled, causes the build material to pack densely and uniformly in the feed chamber. This greatly reduces the need for the operator to work the air out of the build material with a trowel during filling, a time consuming process that tends to produce an undesirable cloud of airborne powder.

It has also been found that drawing air from the build material through the bottom or sides of the build chamber 26 causes the build material to pack more densely in the build chamber. This denser material provides better support for the part being formed in the build chamber. This helps to prevent the part from moving or shifting during the build process, thereby improving the quality of the part being formed.

Figure 3C:
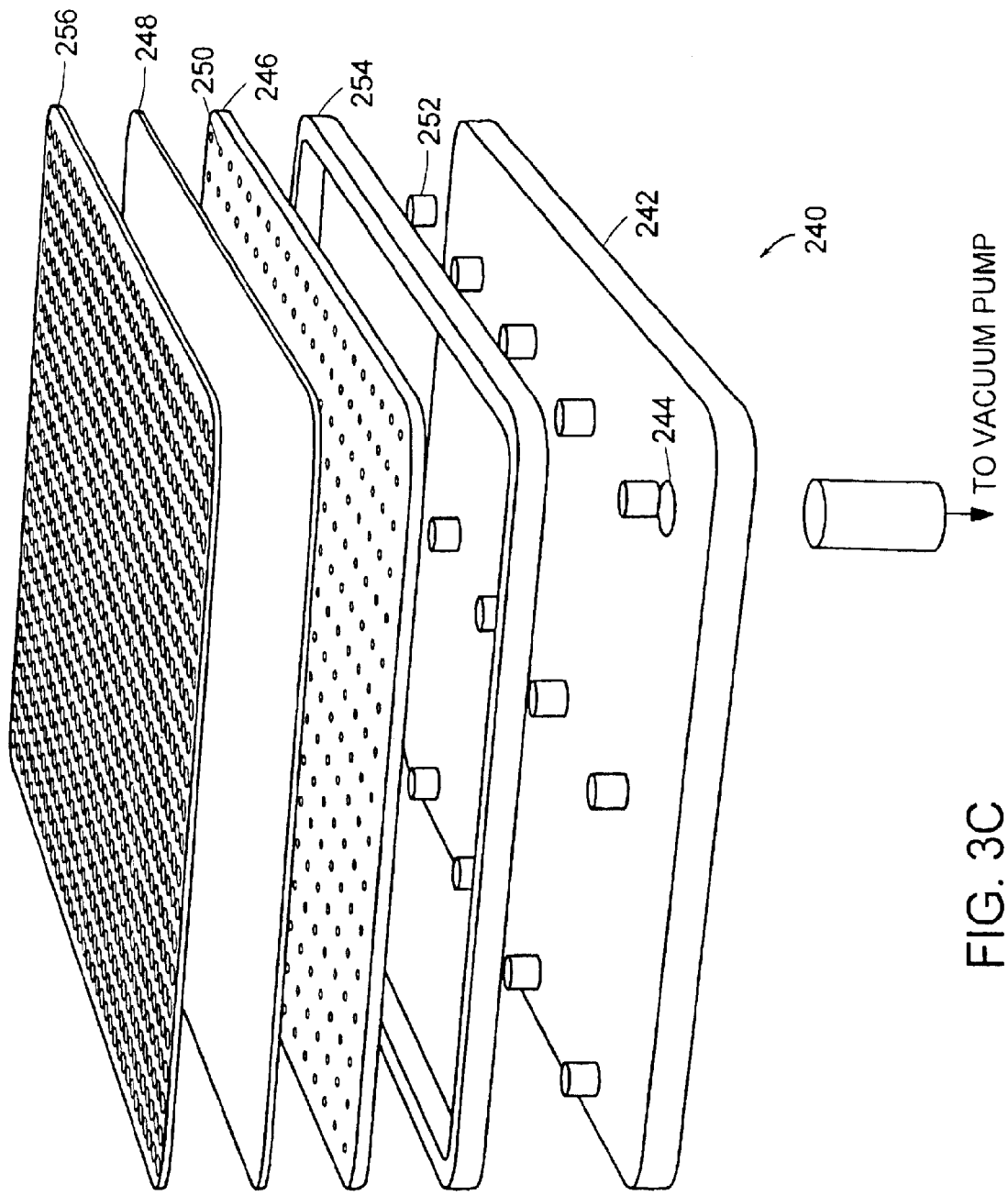
FIG. 3C is a perspective view of a plenum for use with the three-dimensional printer of FIG. 1.

FIG. 3C illustrates one embodiment of a plenum 240 positionable on the bottom of the feed chamber 24 and build chamber 26. The plenum 240 includes a piston plate 242, which serves as a base for the plenum. A vacuum pump is attached through a port 244.

Above the piston plate 242 is a top plate 246 that provides support for a filter medium 248 and is perforated with holes 250. The filter medium 248 maintains a separation between the build material and the vacuum system, which can further include additional in-line filters. The holes 250 provide passage for downward airflow and can be arranged for optimum airflow characteristics.

In addition, a plurality of spacers 252 are provided between the piston plate 242 and plate 246 to establish a space for ensuring an even distribution of vacuum in the plenum 240. In addition, gasket 254 between the piston plate 242 and plate 246 inhibits air leakage around the edges of the plenum 240. A mesh 256 is provided above the filter 248 to protect it during setup and cleanup operations. The plenum 240 is sandwiched together with screws along the perimeter that extends from the mesh 256 to the piston plate 242. A seal can be provided on the perimeter of the plenum 256 to prevent powder loss between the piston and the chamber wall.

Figure 3D:
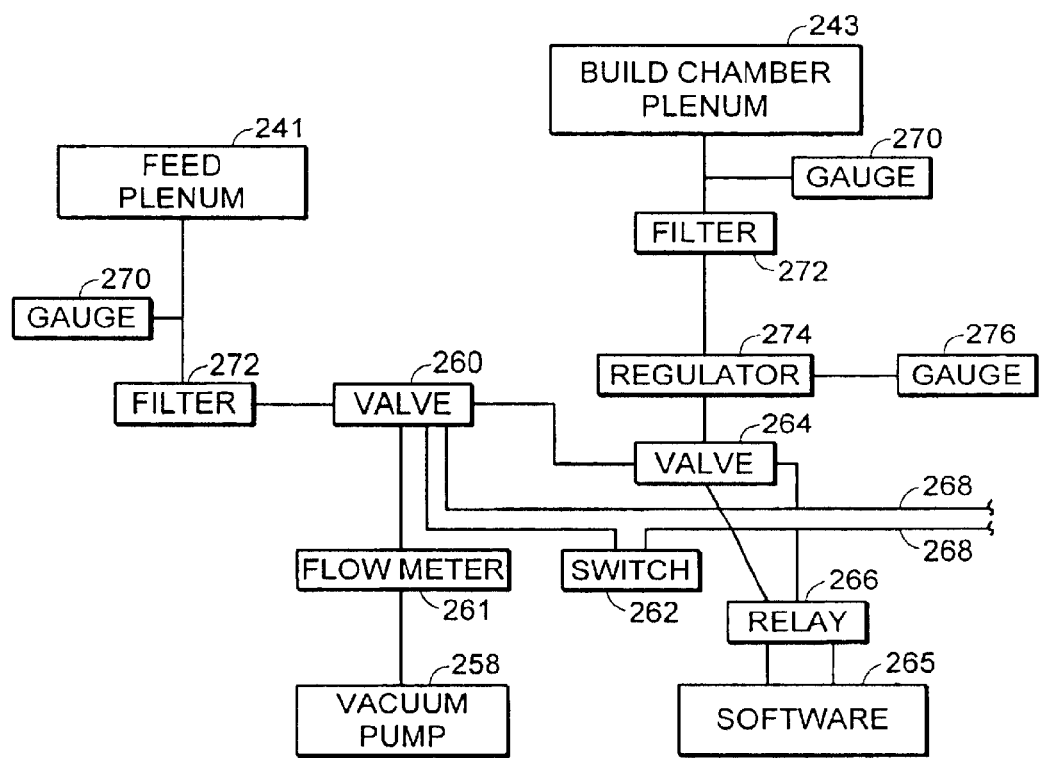
FIG. 3D is a schematic for controlling the airflow through the feed chamber and build chamber of the printer of FIG. 1.

FIG. 3D is a schematic for controlling the airflow through the feed chamber 24 and/or build chamber 26. As shown, a vacuum pump 258 is coupled to the feed chamber plenum 241 and build chamber plenum 243 for creating an airflow through either or both plenums. In one embodiment, vacuum pump 258 is capable of pulling a vacuum level of about 10 inches of mercury with a flow rate of 1½ to 2 $in^3$ of air per minute. A first valve 260 is shown disposed between the vacuum pump 258 and the feed plenum 241 and build chamber plenum 243. The first valve 260 allows selective directioning of the airflow through either the feed plenum or the build plenum. In particular, a switch 262 is configured to be activated by the user, for example, to direct the valve 260 such that all the airflow is directed through the feed plenum 242 while the user is filling the feed chamber 24. After the feed chamber 24 is filled, the user can activate the switch 262, which can be a foot pedal, to direct all the airflow through the build plenum 243. A flow meter 261 can be disposed between the valve 260 and/or vacuum pump 258 to measure the air volume flow rate between this valve 260 and the vacuum pump.

A valve 264, which can be a three-way valve, can be further provided between the valve 260 and the build chamber plenum 243. The valve 264 is coupled to and controlled by software instructions 265. More particularly, the software instructions 265 control the valve 264 to selectively allow airflow through the build chamber plenum 243 during the fabrication process by controlling a solid state relay 266 to make contact between power lines 268. For example, airflow can be allowed through the build chamber plenum 243 during application of the build material but turned off during printing of the liquid binder material. In-line gauges 270 can be provided adjacent to the feed and/or build plenums to measure the level of vacuum at these locations. In-line filters 272 can be further provided to filter any build material or debris that may pass through or around plenums 241 and 243. In one embodiment, an adjustable regulator 274 can be provided between the build chamber plenum 243 and the valve 264 for controlling the flow of air through the build chamber plenum 243. A gauge 276 can be further coupled to the regulator 274 for measuring the level of vacuum through the regulator.

Printing

Figure 4A:
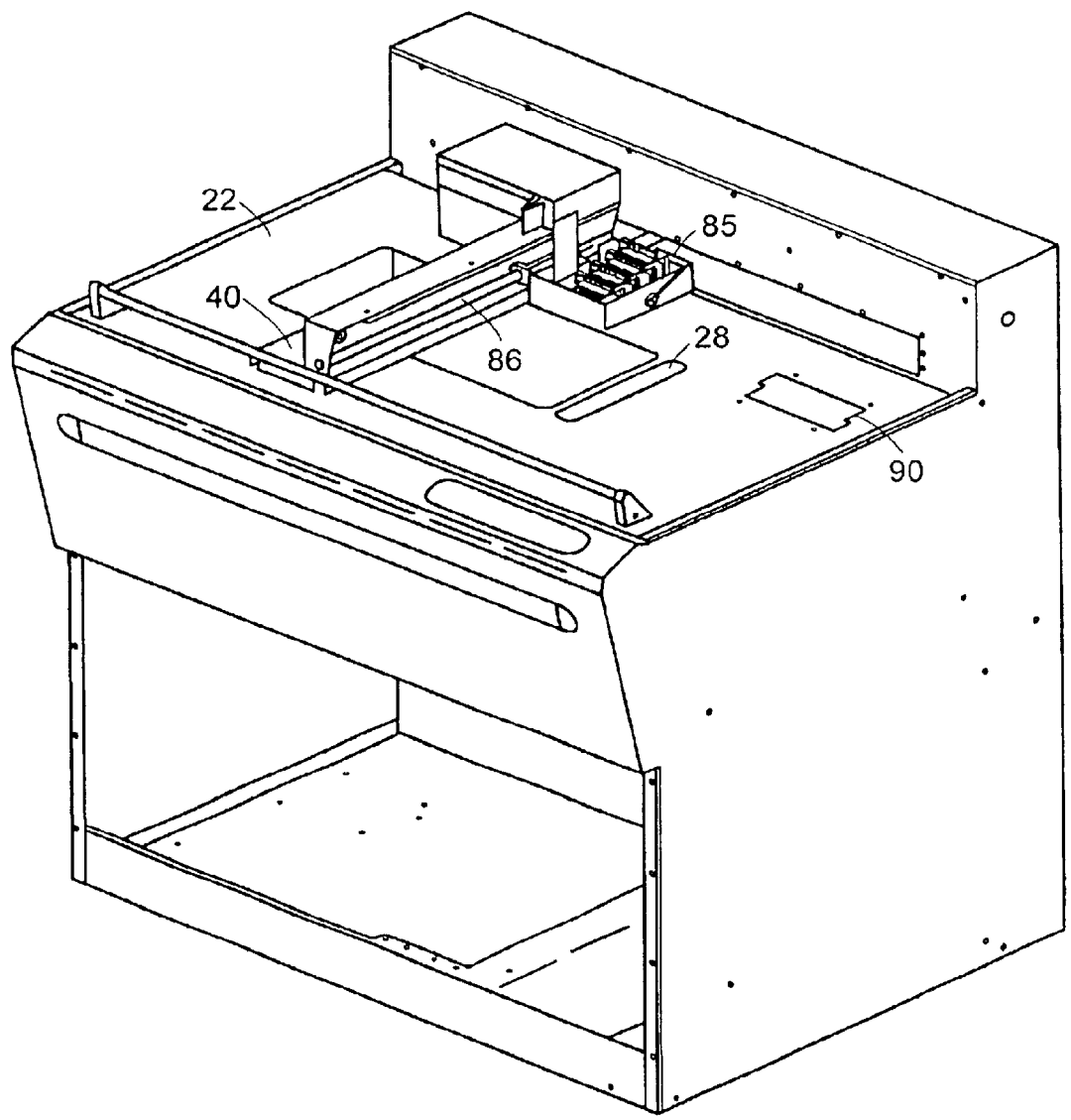
FIG. 4A is a perspective view of an embodiment of a three-dimensional printer of FIG. 1.
Figure 4B:
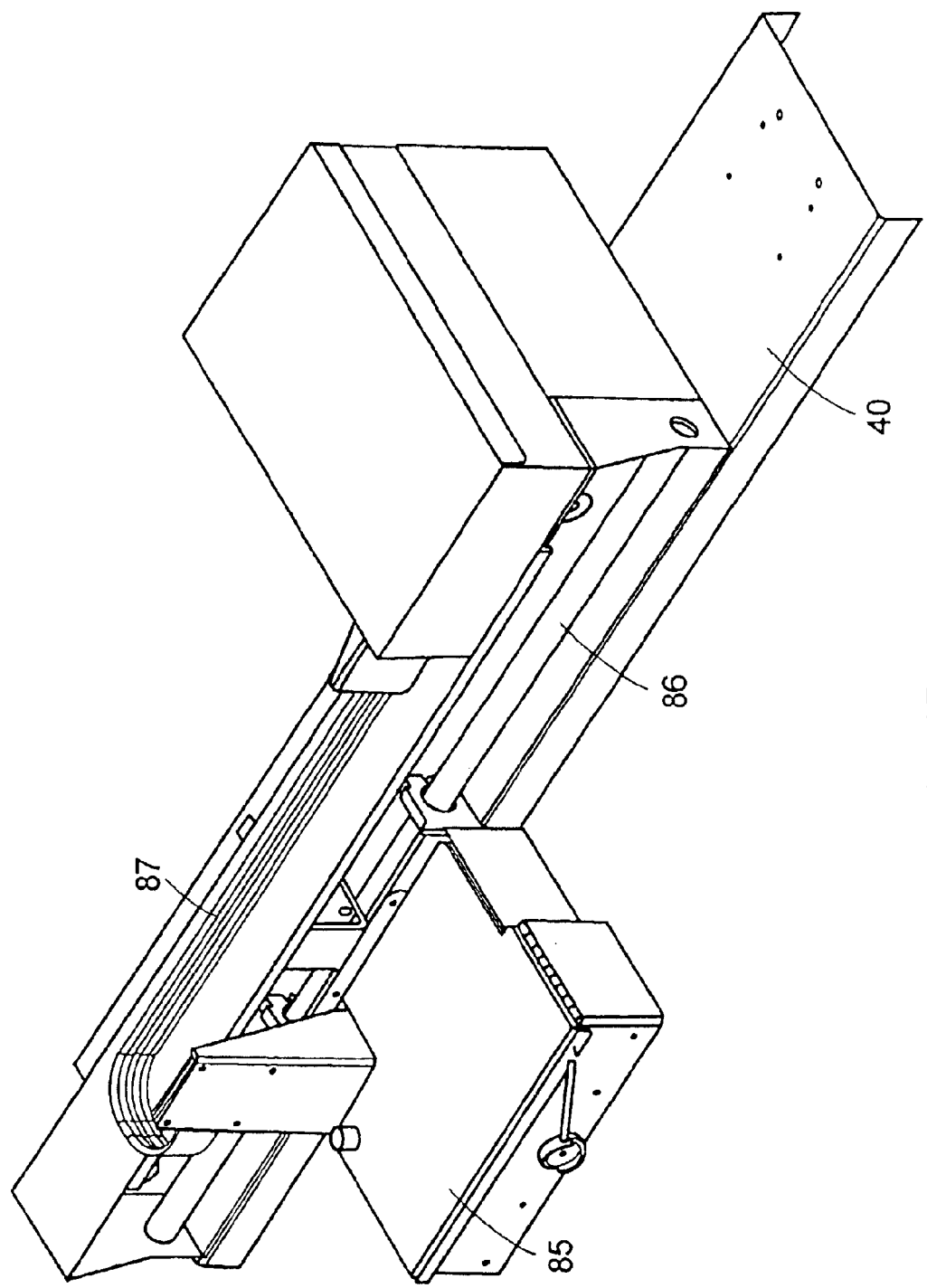
FIG. 4B is a perspective view of the gantry of the printer of FIG. 4A.
Figure 4C:
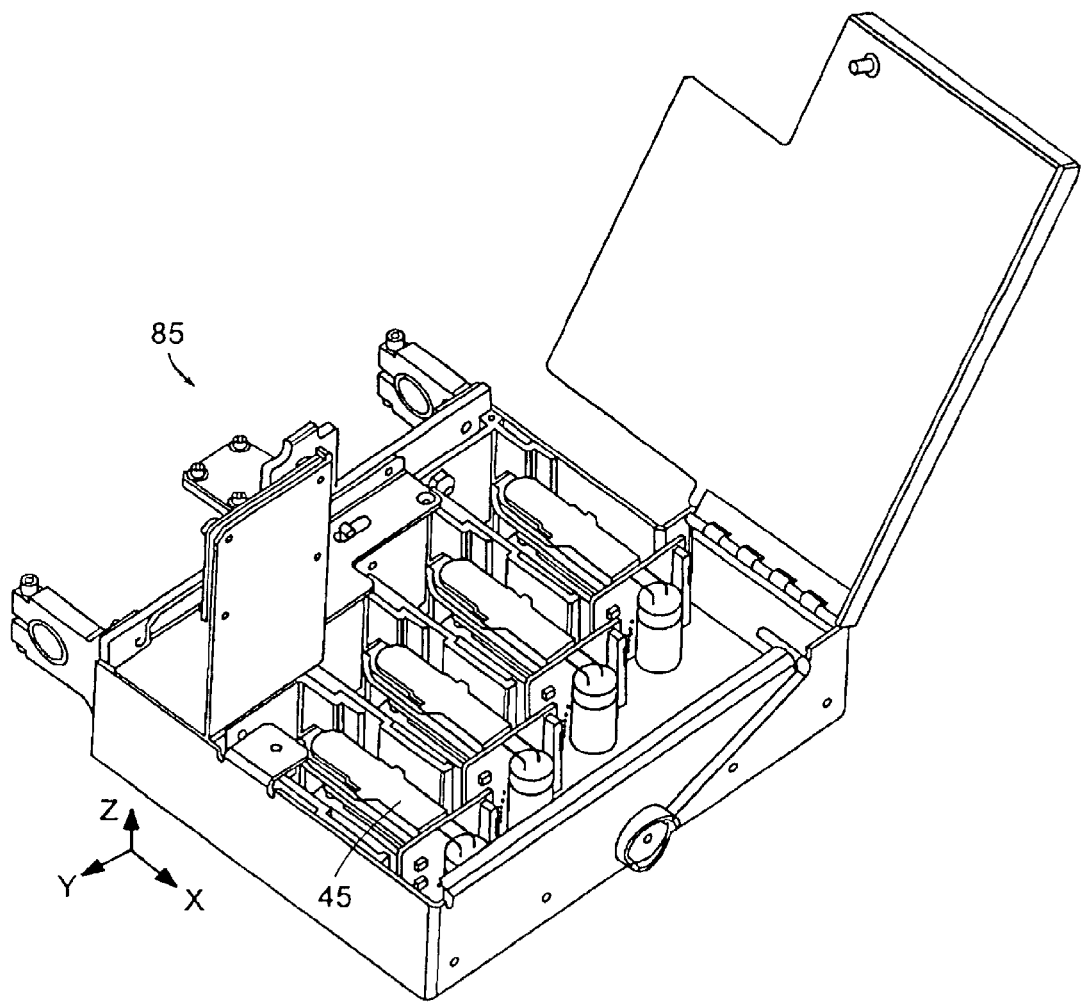
FIG. 4C is a perspective view of the carriage of FIGS. 4A and 4B with its cover open.

Elements of a three-dimensional printer that is particularly suited for high-speed printing in both mono-color and multi-color modes are illustrated in FIG. 4A. A carriage 85 is mounted for reciprocation on the gantry 40. The carriage 85 can reciprocate along the y-axis (fast axis) via a rail 86. The carriage 85, with its cover closed, and the gantry 40 are illustrated with the binder conduits 87 in FIG. 4B. The carriage 85 with its cover open is illustrated in FIG. 4C.

Four substantially-identical printheads 45 (such as Hewlett Packard Part No. C4800A) are mounted within the carriage 85. Each of the printheads 45 are coupled with one of the conduits 87, which in turn are coupled with external binder liquid sources. In one embodiment, one printhead is coupled with a source providing a binder liquid including cyan colorant; a second printhead is coupled with a source providing a binder liquid including magenta colorant; a third printhead is coupled with a source providing a binder liquid including yellow colorant; and the fourth printhead is coupled with a source providing a clear (or white) binder liquid. A fifth printhead coupled with a source supplying a binder liquid including black colorant and offset from the other printheads along the x-axis can further be provided within the carriage 85. The various colorants can be pre-mixed with binder liquid and stored in respective fluid sources, or the colorants can be separately stored and mixed with binder liquid in the machine, for example, at the printhead before printing.

FIGS. 5A–5D are schematics illustrating a process for handling the build powder. Illustrated are the feed chamber 24, the build chamber 26 and the overflow chute 28 depressed in the top deck 22. A supply of build powder 60 is supported in the feed chamber 24 by the movable feed piston 25, and the build table 27 is shown within the build chamber 26. As known in the art, the feed piston 25 moves incrementally upward (in the z+ direction) during operation, while the build table 27 moves incrementally downward (in the z− direction). An airflow down through the overflow chute 28 is created by the blower 34 (FIG. 3A).

Figure 5A:
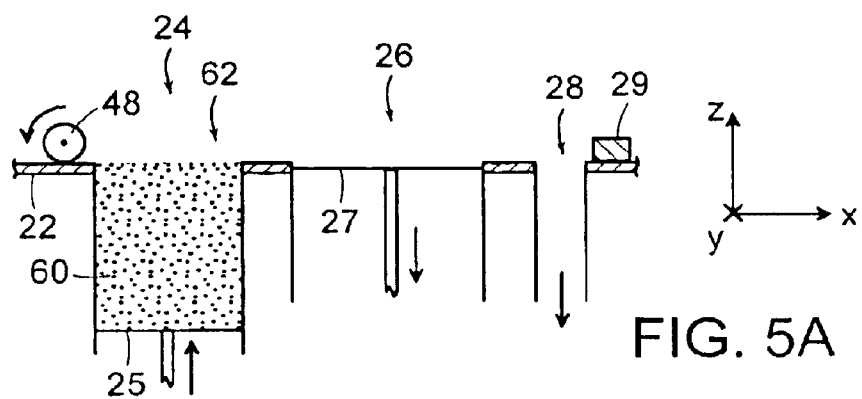
FIGS. 5A–5D are schematics of a process for controlling print medium.

Referring to FIG. 5A, the floor 25 of the feed reservoir chamber 24 has been positioned such that a sufficient quantity 62 of build material 60 for one build layer protrudes above the feed chamber 24. The build table 27 has been positioned to a specific depth to receive a first layer of build material. In one embodiment, the build table 27 is incrementally lowered to create a plurality of successive build layers, each about 3–9 mils thick.

Figure 5B:
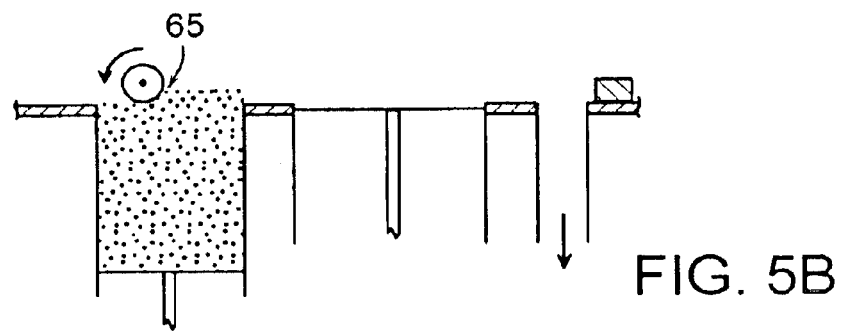
Figure 5C:
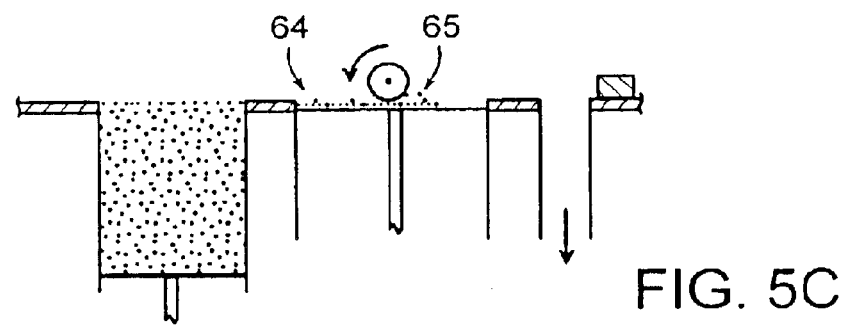
Figure 5D:
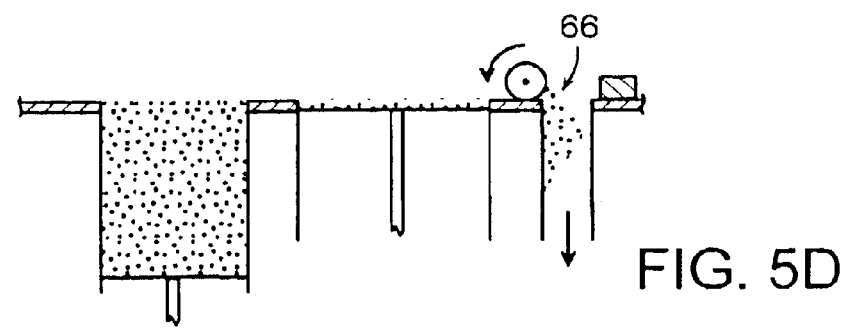

Referring to FIG. 5B, the roller is rotated counter to its forward motion to push the quantity of build material 62 forward toward the build chamber 26. As illustrated in FIG. 5C, the roller 48 continues across the build chamber 26 to deposit a finite layer of build material 64 onto the build table 27. To assure that a full build layer is deposited on the build table 27, an excess amount of build material 60 is provided by and removed from the feed reservoir 24. This excess build material 66 is dumped by the roller 48 into the overflow chute 28 where gravity and air flow carry the particles to the collection bucket 81 (FIG. 3A).

Referring again to FIG. 2, as the gantry 40 passes over the top deck 22, a crusted layer is typically generated on the bottom of the gantry as a result of airborne powder mixing with airborne binder material at the gantry surface. This layer tends to become thick over time and drag on the powder bed, causing indentations or grooves on the top layer of the powder bed and leading to flaws in the final part. Small brushes, loop material (e.g., Velcro® fastener material), or another abrasive 29 can be placed on the top deck 22 to scrape excess debris from the bottom of the gantry. This debris may be drawn down into the overflow chute 28.

Having laid a current layer with movement of the gantry in the x-direction, the 2-D cross-section of that layer is printed. In particular, the printing occurs during successive passes of the printhead in the y-direction during a pass of the gantry in the negative x-direction. Other printing methods can be used instead, as described in detail below.

As the build material is being spread, a wave of powder 65 results and tends to move laterally relative to the roller's direction of motion. The plows 49 tend to contain the wave of powder 65. This prevents build material from spilling over onto the top deck 22 and forming a ridge, which is undesirable from the standpoint of machine reliability and user satisfaction. The plows 49 form a seal against the ends of rotating and translating spreader roller 48 and against the top of the top deck 22. Springs can be utilized to generate an inward force on the plows 49 toward each other, causing the plows 49 to form a tight seal with the spreader roller 48. Springs also generate a downward force on the plows 49 to form a seal with the top of the top deck 22.

The plows 49 can be fabricated from an oil-filled plastic material to reduce the friction between the bottom of the plows 49 and the top of the top deck 22 during powder spreading. The oil-filled material also forms a barrier which prevents powder from sticking to the bottom of the plows 49. In addition, the oil-filled material may also provide a self-replenishing release layer on the bearing surface of top deck 22.

As the spread roller 48 pushes the wave of powder 65, there is an accumulation of powder on the leading edge, which gets pushed sideways onto the area in front of the plows 49. This powder is pushed along by the plows 49 until it is finally drawn or dropped into the overflow chute 28 or piled out of the way. The overflow chute 28 can be wider than the feed reservoir 24 and build chamber 26 openings to capture this excess powder.

The impact of the binder hitting the powder layer during printing causes powder to fly up and hit the bottom of the printhead. Because the printhead may be wet with binder, the powder may then harden and form a crust on the bottom of the printhead, or it could possibly eventually get inside the jets, thereby clogging the outlet of the jets. In addition, excess binder may occasionally form droplets that rest on the bottom of the printhead and remain there as a result of surface tension. This effect can also cause blocking of the outlet of the jets or deflection of the jets. When jets are blocked or deflected, the binder is not deposited where desired, thereby causing faults in the final part. Therefore, a method is desired to clean the powder or binder from the bottom of the printhead to keep the jet outlets open.

Figure 4D:
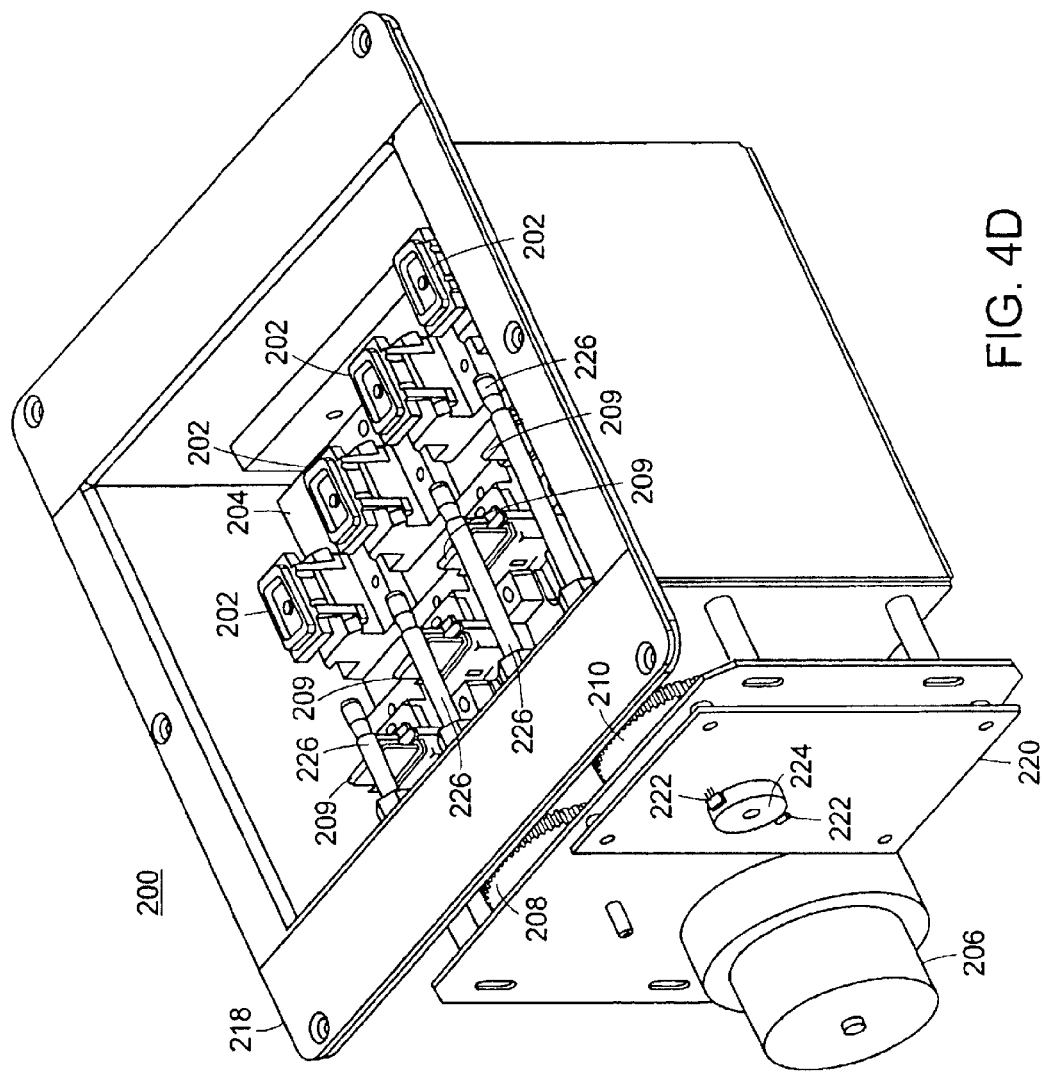
FIG. 4D is a perspective view of a cleaning assembly used to clean the print jets.
Figure 4E:
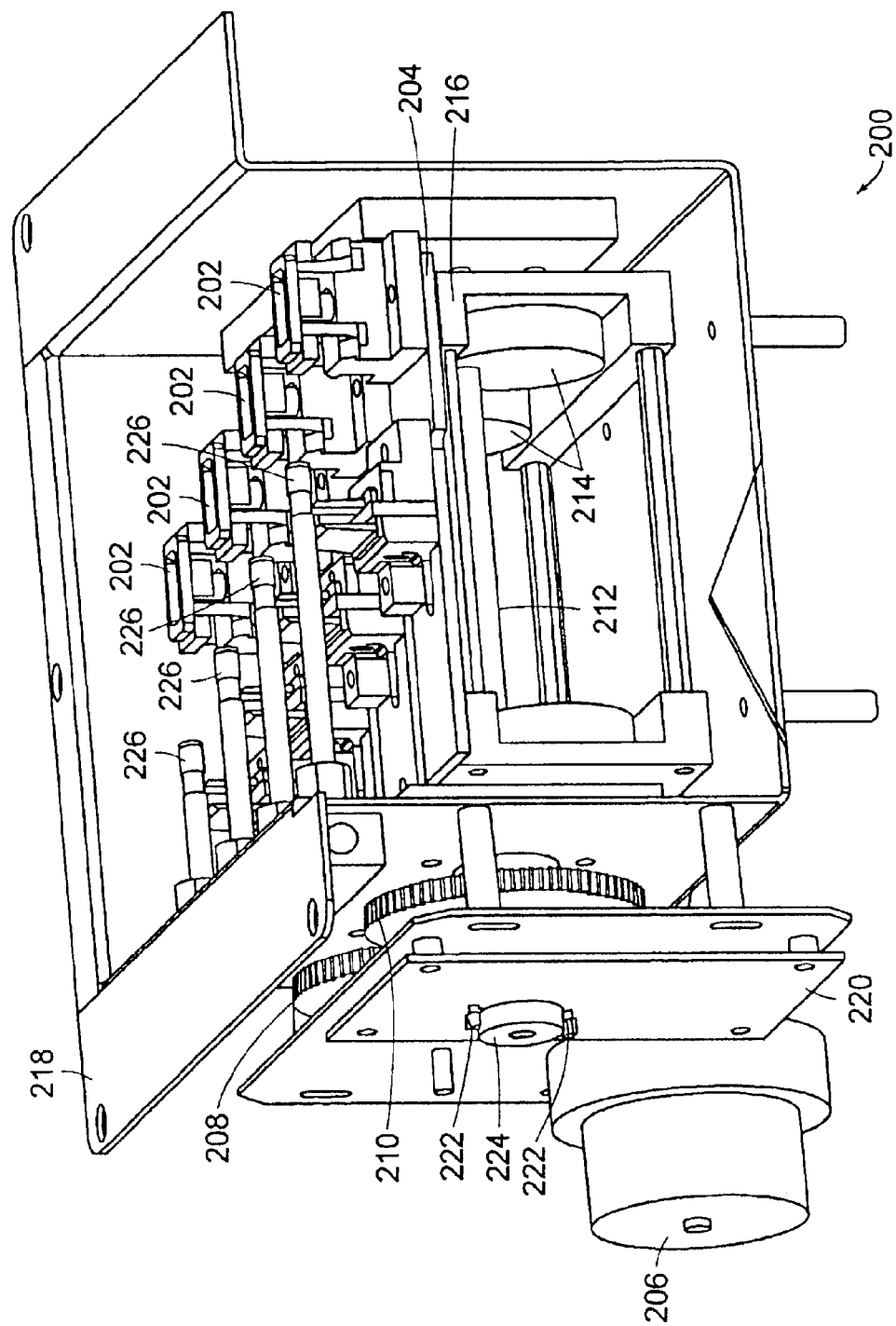
FIG. 4E is a partial perspective view illustrating the internal components of the cleaning assembly shown in FIG. 4D.

As shown in FIG. 4A, a depression 90 is formed in the top deck 22 which includes at least one squeegee or wiper element movable with respect to the structural frame and top deck 22 for cleaning the print jets. This depression 90 can be formed anywhere on the deck such that the squeegee(s) will be in the path of the print jets. In the embodiment of FIG. 4A, the depression 90 is formed away from the overflow chute 28 opposite the build feed reservoir 24 and build chamber 26. As further illustrated in FIGS. 4D and 4E, a cleaning assembly 200, which is mounted within the depression 90, includes squeegees 209 mounted on a support element 204, which moves up or down by motor 206. More specifically, a motor 206 rotates a gear 208, which intermeshes with and drives a gear 210. The gears 208, 210 are connected to and rotate shafts 212 (only one shaft shown in FIG. 4E), which rotate cams 214 to raise and lower an intermediate element 216, which is attached to a support element 204. A PC board 220 supports sensors 222, which sense the position of squeegees (up or down) by sensing the position of a wheel 224 attached to one of the shafts 212. The wheel 224 includes embedded magnets that are sensed by the sensors 222 to determine whether the squeegees are up or down. The cleaning assembly 200 can include a flange 218 for securing the assembly within the depression 90.

In operation, as the gantry 40 moves past the overflow chute 28 and toward the depression 90, the motor 206 raises the support element 204 upward such that the squeegees 209 extend above the deck 22 to scrape against and clean the printhead faces. The squeegees 209 are then retracted into the depression 90.

In another embodiment, the cleaning squeegee can be fixed in place, such as on the top deck 22. The cleaning squeegee can then be positioned so that the printhead periodically passes over the squeegee, such as every printing pass. Accumulated powder and binder can then be scraped off the printhead by the squeegee. The squeegee can then be cleaned by a cleaning agent from, for example, a proximally-located cleaning jet or from the printhead jets itself. Suitable drainage solutions can also be incorporated into the printer to carry away the waste material. Although a fixed squeegee is less mechanically complex, it may not be suitable for all embodiments.

Although more complex, an advantage of retractable squeegees is that they are protected in the depression 90 when not in use. Also, when the squeegees 209 are positioned below the deck 22 or are moving downward, a nozzle or nozzles 226 containing a cleaning agent, for example, clear binder, can be directed at the squeegees for cleaning the same. With the nozzles 226 positioned below the deck 22, the spray of the cleaning agent is relatively contained within the cavity 90.

In alternative embodiments, the cleaning agent can include a fluid that has lubricating characteristics. That is, the cleaning agent deposits a film on the squeegees 209 that is transferred to the print jets such that the build material is less inclined to stick to the print jets. In a particular embodiment, the cleaning agent includes water mixed with about 5–20% polyethylene glycol.

A support element 204 also carries printhead cap assemblies 202 that can be used to protect the printheads when they are not in use.

Print Speed and Part Quality

Maximizing build speed is of great interest to the user. The build time has two primary components: the spreading of the powder and the depositing of the binder liquid. The rate of spreading powder is limited by several factors, including the need to maintain a smooth top layer and to minimize airborne powder. Therefore, one method of increasing the build rate is to increase the rate of binder deposition. A method to increase the speed of depositing binder includes using multiple printheads.

Figure 6:
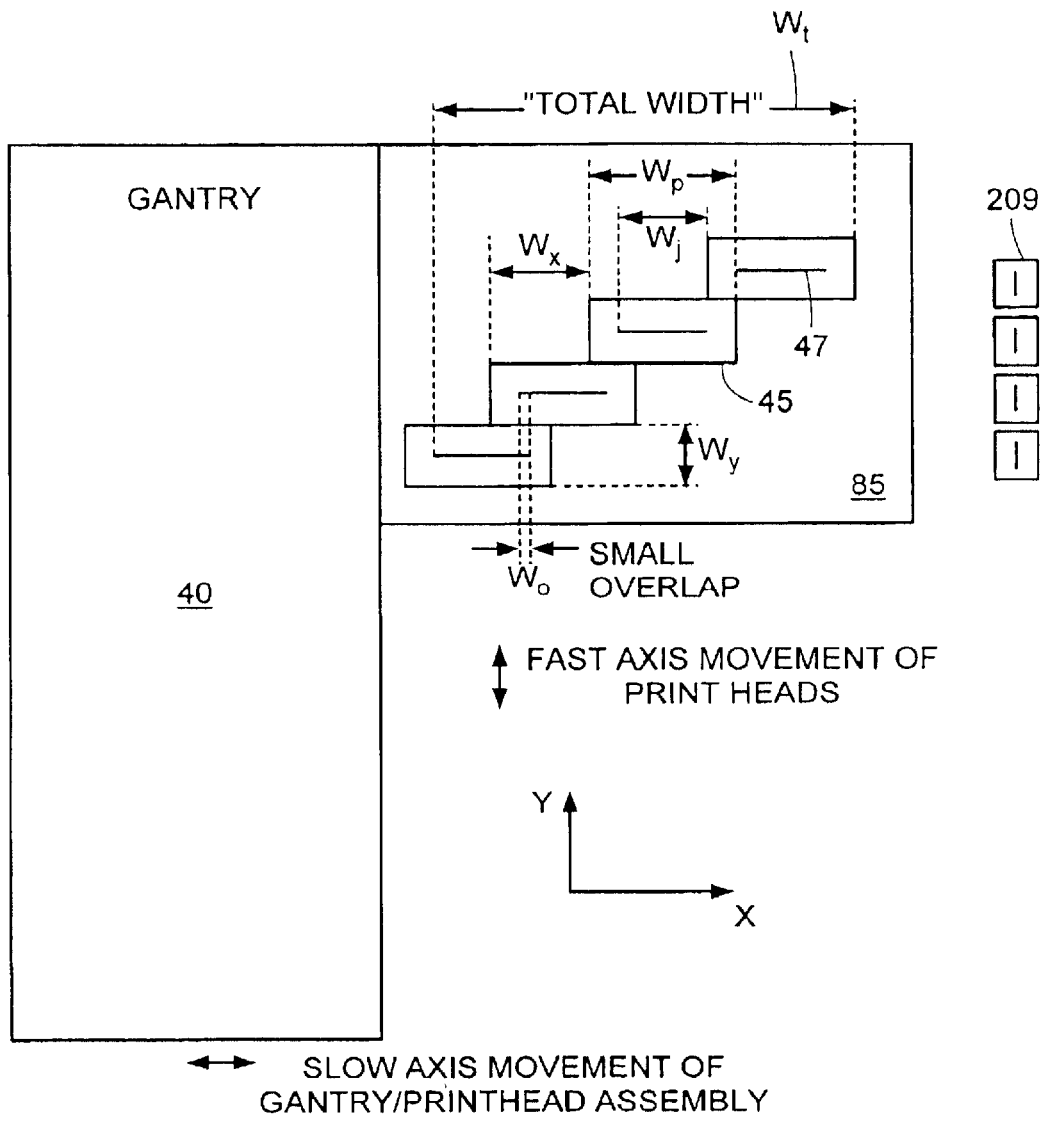
FIG. 6 is a schematic of an apparatus employing multiple printheads.

FIG. 6 is a schematic of an apparatus employing multiple printheads. This arrangement maximizes print speed in monochrome print mode because all printheads 45 can print simultaneously, thereby completely covering a total width Wt in the x direction equal to the width of each jet array Wj multiplied by the number of printheads. After printing this total width Wt through the entire y direction, the gantry then advances by a distance equal to the total width Wt in the x-direction. Then the printheads 45 print again covering the total width Wt through the entire y direction again.

This arrangement is also efficient for color printing. In the particular case shown in FIG. 6, there are four printheads 45; each of three printheads prints a primary color and one prints clear. In the case of color printing, the gantry advances by just the width of one jet array Wj, so that each printhead, with its unique color, has the opportunity to pass over each region of the powder.

The reason that the printheads 45 are not placed directly next to each other is that the width of each printhead Wp is greater than the width of the jet array Wj, so if they were placed next to each other there would be a vertical stripe that would not be printed. Therefore, in order to be able to print on every region, the printheads 45 are offset in the y axis by an offset distance Wy to accommodate the physical constraints of the printheads 45.

The printheads 45 are also offset by an offset Wx along the x-axis. In fact, the printheads 45 are aligned such that there is a small overlap Wo of printing coverage in the x axis; that is, two adjacent printheads 45 could print on the same x position simultaneously. This allows for less accuracy during the design and manufacturing process because the printheads 45 can be calibrated after the machine is assembled. Then one of the overlapping printheads 45 can be instructed not to print the few pixels that overlap with those of the another printhead.

Also shown in FIG. 6 are the cleaning elements 209. The cleaning elements are aligned along the y-axis, and spaced so that each cleaning element registers with a respective printhead.

It should be recognized that other multiple printhead configurations can be employed. Detailed descriptions of other exemplary embodiments are disclosed in the incorporated U.S. application Ser. No. 09/416,787. The choice of configurations is a design consideration taking into account various parameters including the printhead specifications.

For example, the printheads 45 can be arranged in a row along the fast y-axis to form a continuous sequence of binder jets. Such an arrangement would not require movement or reciprocation of the printheads 45 along the fast y-axis during binder deposition.

A variation of this arrangement can include a partial row of printheads along the fast y-axis. Binder deposition would first occur during passage of the printheads along the slow x-axis (in the $x^+$ direction). Once that pass is complete, the printheads can be indexed along the fast y-axis and binder deposited on the return pass (in the x-direction). This process can be repeated until full coverage is achieved.

It is also desired to achieve consistently high part strength despite various problems with the operation of particular jets. For example, occasionally certain jets in the printhead may not be firing or the firing may be flickered as a result of a head that is manufactured poorly or one that has become contaminated by powder.

Figure 7:
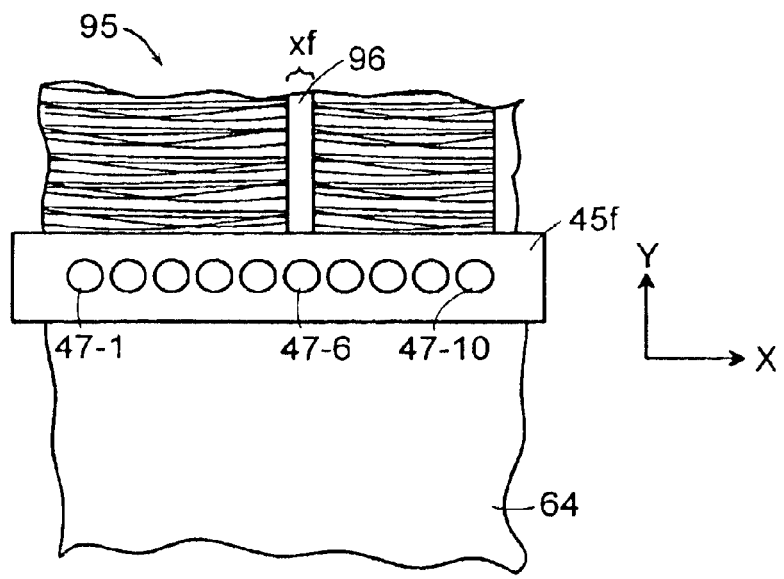
FIG. 7 is a schematic of a printhead having a faulty binder jet.

FIG. 7 is a schematic of a printhead having a faulty binder jet. As illustrated, the printhead 45f is one of a plurality of printheads which print along the y-axis as the gantry 40 (FIG. 2) moves. If a particular jet 47-6 of a printhead 45f does not fire, then a stripe 96 may appear in the y direction on the particular layer of powder that is being printed 64. This creates an undesired discontinuity in the printed area 95. The problem is that this vertical strip of unbound powder 96 is at the same x location, xf, on each layer, thereby causing a plane of delamination once the part is complete.

Figure 8:
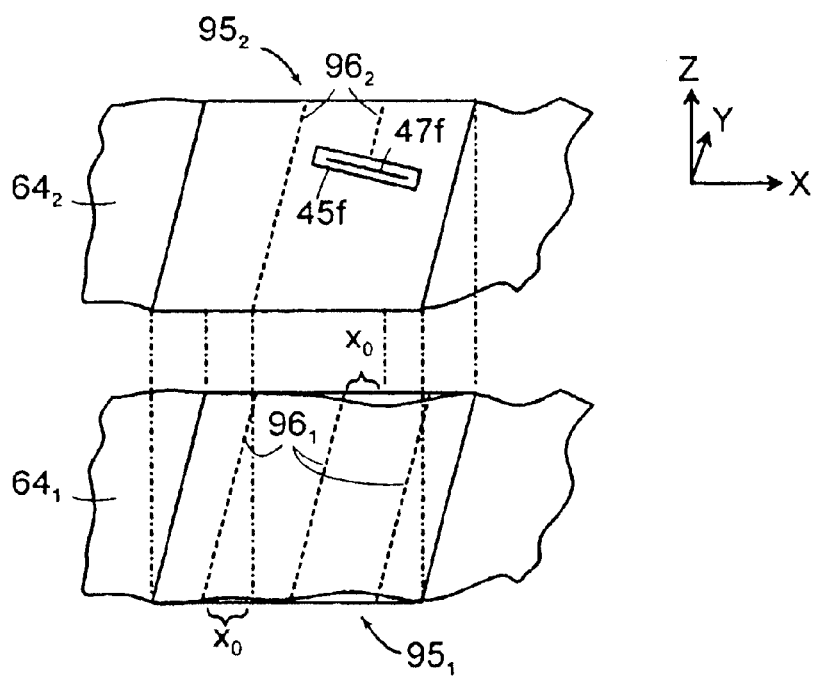
FIG. 8 is a schematic of a method of printing two layers with a faulty binder jet.

FIG. 8 is a schematic of a method of printing two layers with a faulty binder jet. In accordance with the invention, a shingling technique is used to cause the unbound vertical stripes 96-1, 96-2 to be placed in different x locations on each layer 64-1, 64-2, thereby distributing the areas of weakness throughout the entire part, instead of concentrating them into one plane. Therefore, the faulty jet 47-6 is located at a different x location on each pass relative to every adjacent layer. Shingling with a multiple cartridge system can be accomplished by a slight offset $x_0$ of the cartridge 45 along the x-axis prior to laying each new layer of binder.

It is also desirable to optimize the part strength while maintaining a high build rate. By depositing more binder per unit area, part strength can be improved. However, high binder volume deposition has the disadvantages of decreasing the build rate and resulting in part distortion. One method to improve the part strength and minimize part distortion without a large increase in build rate is to increase the volume of binder as it is applied on the perimeter of each layer, thereby forming a hard shell around the part. This can be achieved by increasing the flow rate when the binder is being applied to the perimeter, by applying the binder twice to the perimeter of the part, or by adjusting the binder saturation. This method has the added advantage that it can control distortion of the parts' interior regions.

To optimize the properties of the model, the amount of binder applied per unit area can be adjusted to match both the specific powder type being used and the geometry of the model. Nominally (saturation=1), the printhead applies approximately 10–20% by volume of binder solution when printing a solid area. The binder volume per unit area can be reduced below this level (saturation<1) while maintaining the same area scan rate by omitting some portion of the pixels printed. To print at a higher than nominal binder volume per unit area (saturation>1), the area scan rate can be reduced while maintaining the same flow from the printhead. This can be accomplished by scaling up the bitmap image in the fast scan direction while simultaneously slowing down the fast axis motor proportionately. To obtain a saturation of 1.5, for example, a 180×180 pixel area would be scaled up to 180×270 pixels, and the fast axis velocity would be reduced from 90 cm/sec to 60 cm/sec. Through such a variable saturation technique, the strength of the part can be optimized.

For example, a part can be formed having a strong shell and a truss or an egg-crate structure in the parts' interior region. The remainder of the interior can remain as loose powder.

Color Printing

Color ink jet printheads can be incorporated in the printer, thereby providing the capability of printing a wide range of colors or ink. Because the system uses these heads to deposit liquid binder, they can be used to deposit a color binder as the material that causes the porous material to bind. In particular, the powder material is white or colorless and can absorb the ink to color the powder. As a result, an embodiment of the invention can build three-dimensional parts that are essentially full color, the color varying throughout the part.

For example, a product designer can produce models of products with various color schemes, labels and decorations already applied to the surface. In addition, a surgeon can prepare for an operation by dissecting a 3-D color-printed model of a patient's body part to become familiar with the three-dimensional arrangement of organs, tumors, blood vessels, etc. Data for the model can be obtained from a Computed Tomography (CT) or Magnetic Resonance Imaging (MRI) scan.

Although some parts may require colored interior regions, other parts may only need surface coloring. Because the visible surface may be the only portion of a part that needs coloring, software can adjust the color ink for use only on the outer edges of each layer. In such a case, a colorless (i.e., clear or white) or mono-colored binder (i.e., a single color other than white) is used on the inside of part, which is not visible to the user. This conserves color binder, which can be more expensive and more cumbersome for the user to obtain for refill.

A certain quantity of liquid binder can be deposited into a given volume of powder to produce a well-formed part. Too much binder can result in the binder migrating beyond the intended area of the part. This effect is customarily called "bleeding." Quantities of binder below this certain amount, however, produce progressively weaker parts. It is desirable to use a sufficiently optimal quantity of binder independent of amount of color. One method for producing parts with controlled variations in color is as follows.

First, a minimum amount of saturation is determined for printing on the edges of each layer (which are, in the end, the surface of the part). Adequate colorant is added to each colored binder such that at this minimum saturation of printing the surface of the final part will be the pure primary color. There are three printheads that print binder colored with each of the three primary colors. There is a fourth head that prints clear binder.

Before printing each layer, the computer software performs an algorithm that first calculates the amount of colored binder that needs to be printed in each spot by each printhead in order to achieve the desired color. Then the software performs an algorithm which determines the optimum saturation (e.g., increased saturation on the perimeter of each layer, with a truss structure on the interior, as discussed above) for each spot. The software then subtracts the total amount of binder that was already printed by all three color printheads, and then the remaining amount of binder, which is clear and therefore has no impact on the color, is applied by the fourth printhead. Thus each spot receives the correct amount of each color and the correct amount of binder.

To give a background on dithering and halftoning, it is useful to understand it first in monochrome mode. The printer prints onto white powder and could have two sets of jet arrays. One set of jet arrays deposits a black binder, the other set of jet arrays deposits a clear binder which appears white, since the powder is white. At each location in the part being built, the two types of binder are deposited in a ratio to produce the shade of gray, white, or black desired in that region of part. All regions of the part thus receive a sufficient total amount of binder needed to produce a strong part. Such a technique, however, implies printheads that can produce controlled size droplets.

Although an ink jet printhead could be chosen to produce droplets of a controlled range of sizes, most current printheads work best if they are used to produce droplets of one size only. Thus, if the droplets are distributed uniformly across the layer, each location of the part's cross section is hit by either a black droplet or a clear droplet. For dithering or halftoning, these droplets can be distributed in such a manner that when viewed from a sufficient distance a gray is perceived, but when magnified, it is seen as a pattern of dots.

Traditional methods of dithering or halftoning can be used on each layer to determine where to place the droplets of each binder. Algorithms also exist for dithering or halftoning techniques to determine the optimal placement of droplets that fall on what will be the surface of the finished part.

Figure 9:
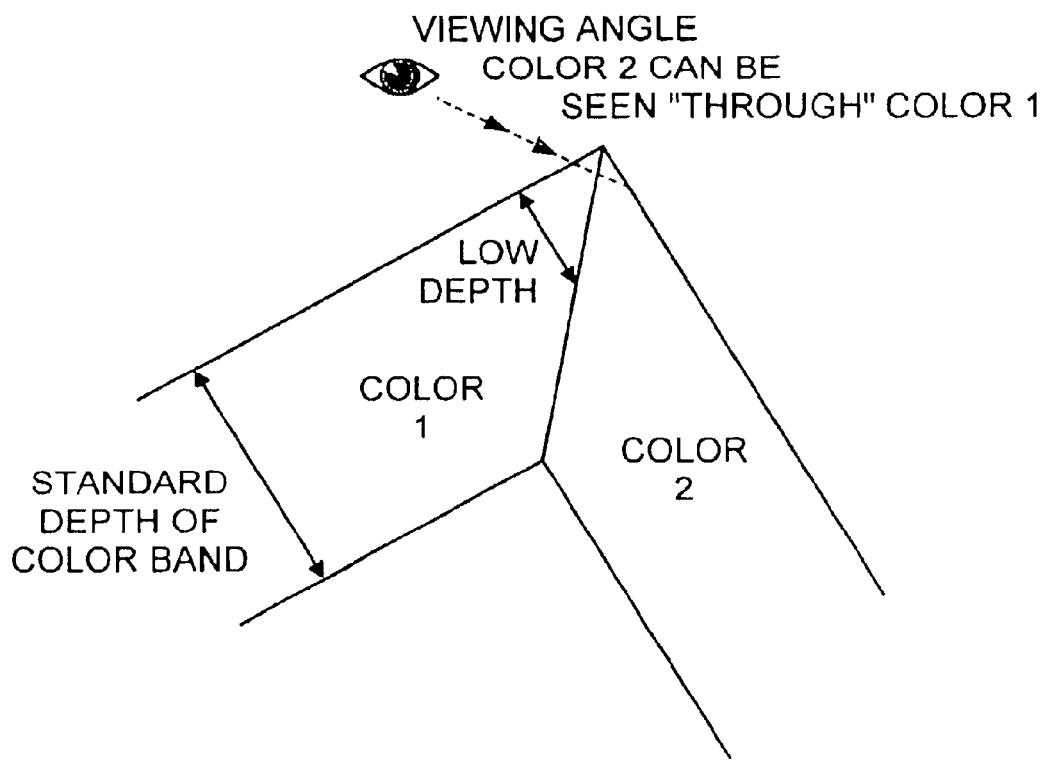
FIG. 9 is a partially cut-away view of an object that has been formed from at least two different colors.

By adding additional nozzles that deposit other colors of binder, the above schemes can be extended to produce full-color parts. Where different-colored surfaces in the printed object interface, an algorithm must be applied to the printed area that forms the color band on the perimeter of each layer (see FIG. 9). The simplest algorithm is a simple miter. It should be noted that the parts are not completely opaque, therefore the color that is perceived by the viewer of a part is dependent on the depth into the surface of the part into which the color is printed. Therefore, a wide color band will produce stronger colors than a narrower color band.

The problem with any coloring scheme for the color band inside a part where two surfaces of different colors interface is that inevitably at least one color will be printed to less depth into the surface of the part. Therefore, the color will be less concentrated to the viewer of the part. To restore the color to the same level as the colored area with standard depth, greater concentrations of colorant can be printed at the edges of the object's surface.

Because the parts are somewhat translucent, the color of the band relating to one surface can impact the perceived color from an adjacent surface. For example, in FIG. 9, if Color 2 is black and Color 1 is white, then the viewer may see the black through the surface that was supposed to be white. To minimize this effect, the respective color bands at adjacent surfaces can be beveled to leave a white or uncolored strip extending from an edge of the object into the object.

Figure 10:
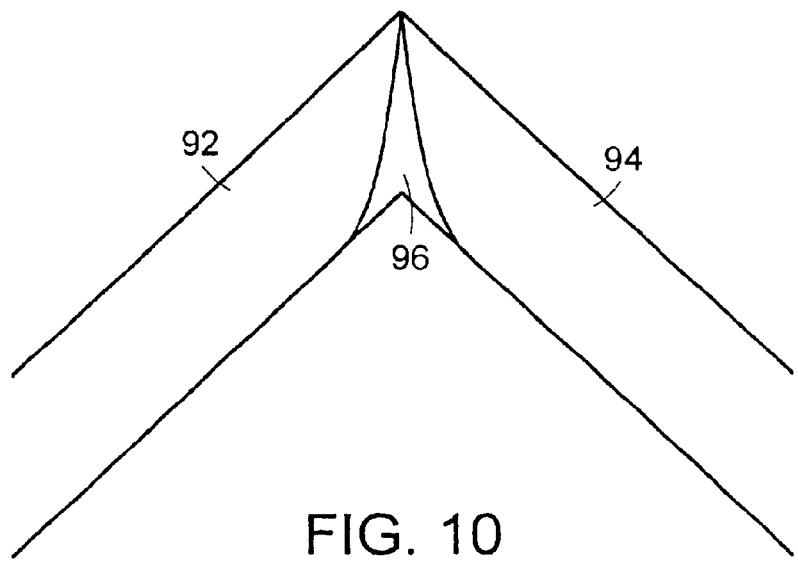
FIG. 10 is a partially cut-away view showing a method of controlling appearance where differing colors meet.

For example, with reference to FIG. 10, a band 92 of a first color meets a band 94 of a second color at a corner. Tapered area 96 is formed of a clear binder such that bands 92, 94 are perceived as their true color and the perception of each color is impacted less by the presence of the other color in the "background."

A problem arises when the quantity of colored binder needed to produce a well-colored part is greater than that needed to produce a well-formed part. In that case a compromise must be made, either in the accuracy of coloring or in the amount of allowed bleeding. If the pigmented liquids do not function as a binder, it is possible to deposit much larger quantities without affecting mechanical properties of the part.

Binder Supply

Figures 2, 11A:
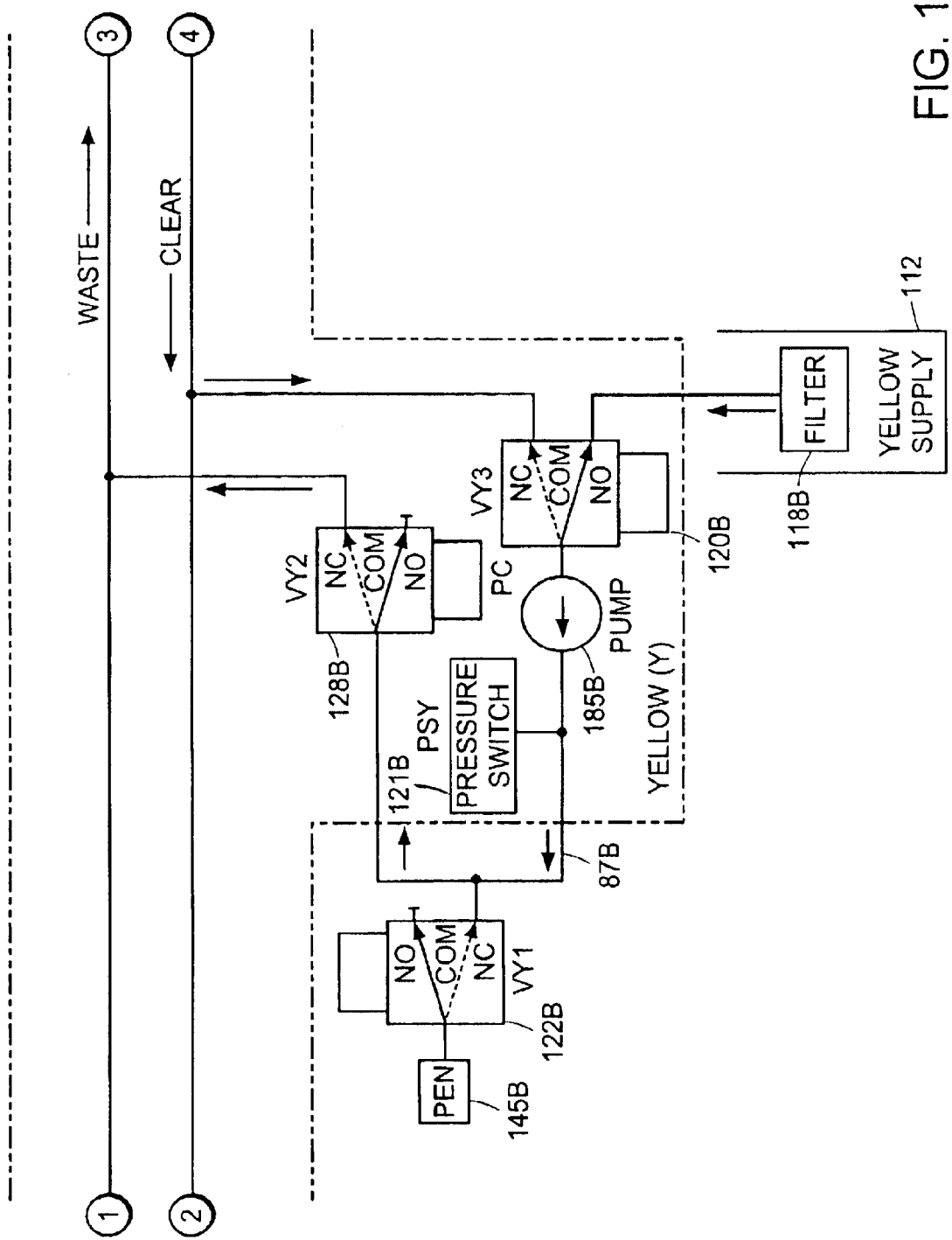
FIG. 11A is a schematic block diagram of a pressure-controlled binder liquid supply system.
Figures 3, 11A:
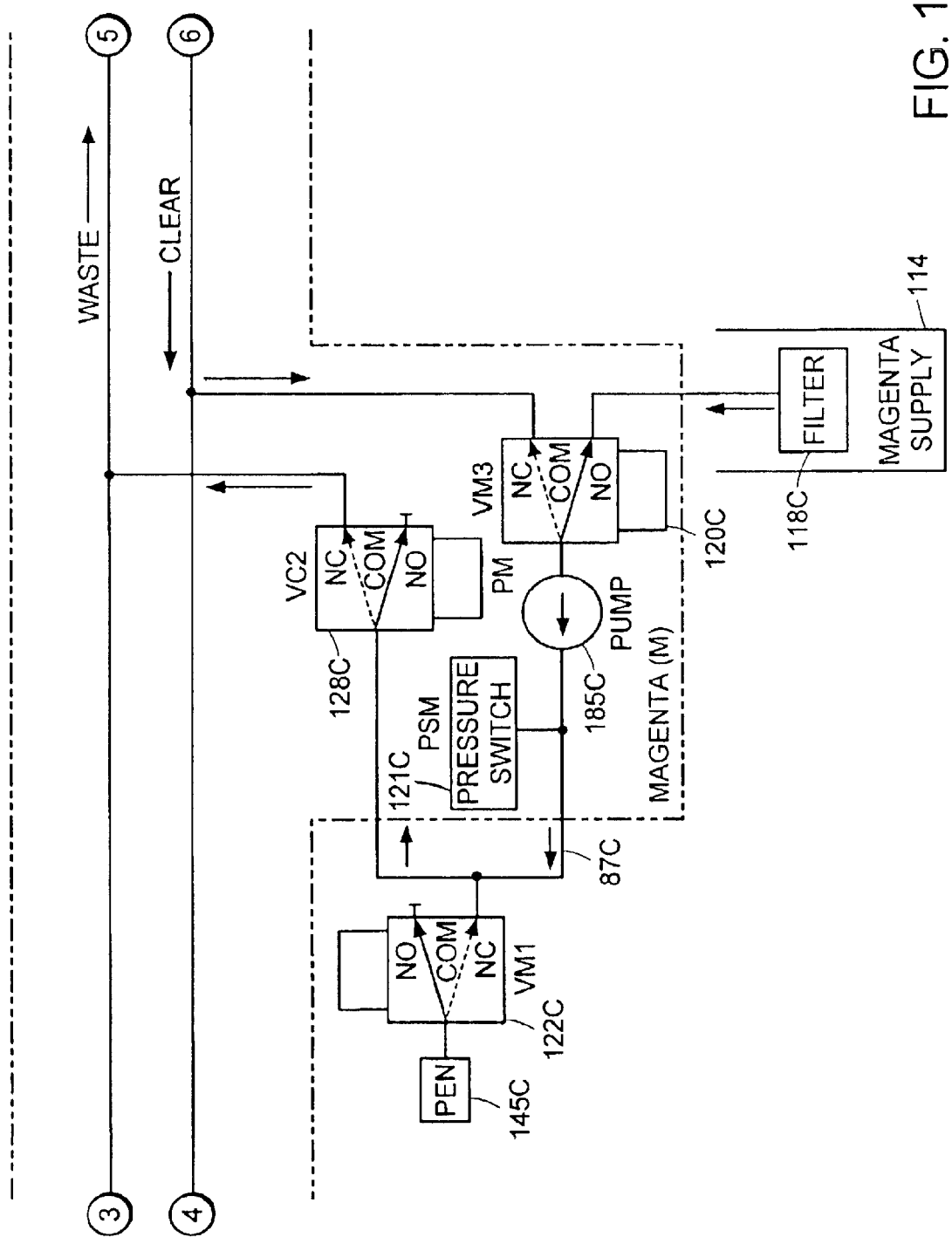
Figures 4, 11A:
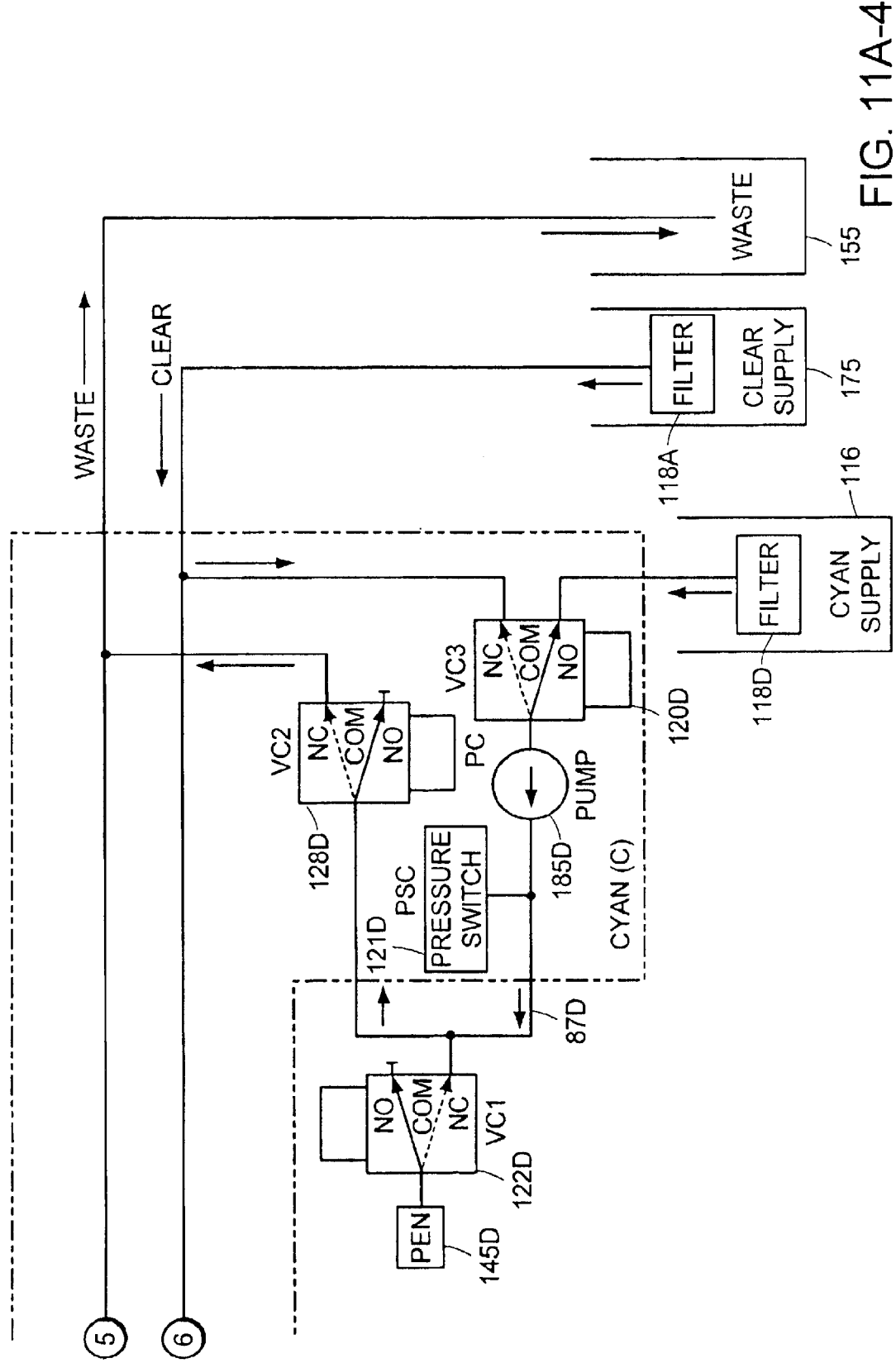

FIG. 11A is a schematic block diagram of a system of printheads 145A–145D fed by pressure-controlled conduits 87A–145D. As shown, the binder supply system includes a plurality of printheads 145A, 145B, 145C, 145D coupled to a plurality of binder supply reservoirs 175, 112, 114, 116 and a waste receptacle 155. As illustrated, a yellow binder supply reservoir 112 is coupled to a yellow-designated printhead 145B, a magenta binder supply reservoir 114 is coupled to a magenta-designated printhead 145C, and a cyan binder supply reservoir 116 is coupled to a cyan-designated printhead 145D. Note that the clear binder supply reservoir 175 is coupled to a clear-designated printhead 145A and also to each of the color-designated printheads 145B, 145C, 145D. All printheads 145A–145D are also coupled to the waste receptacle 155. Further details are described below.

Figure 11B:
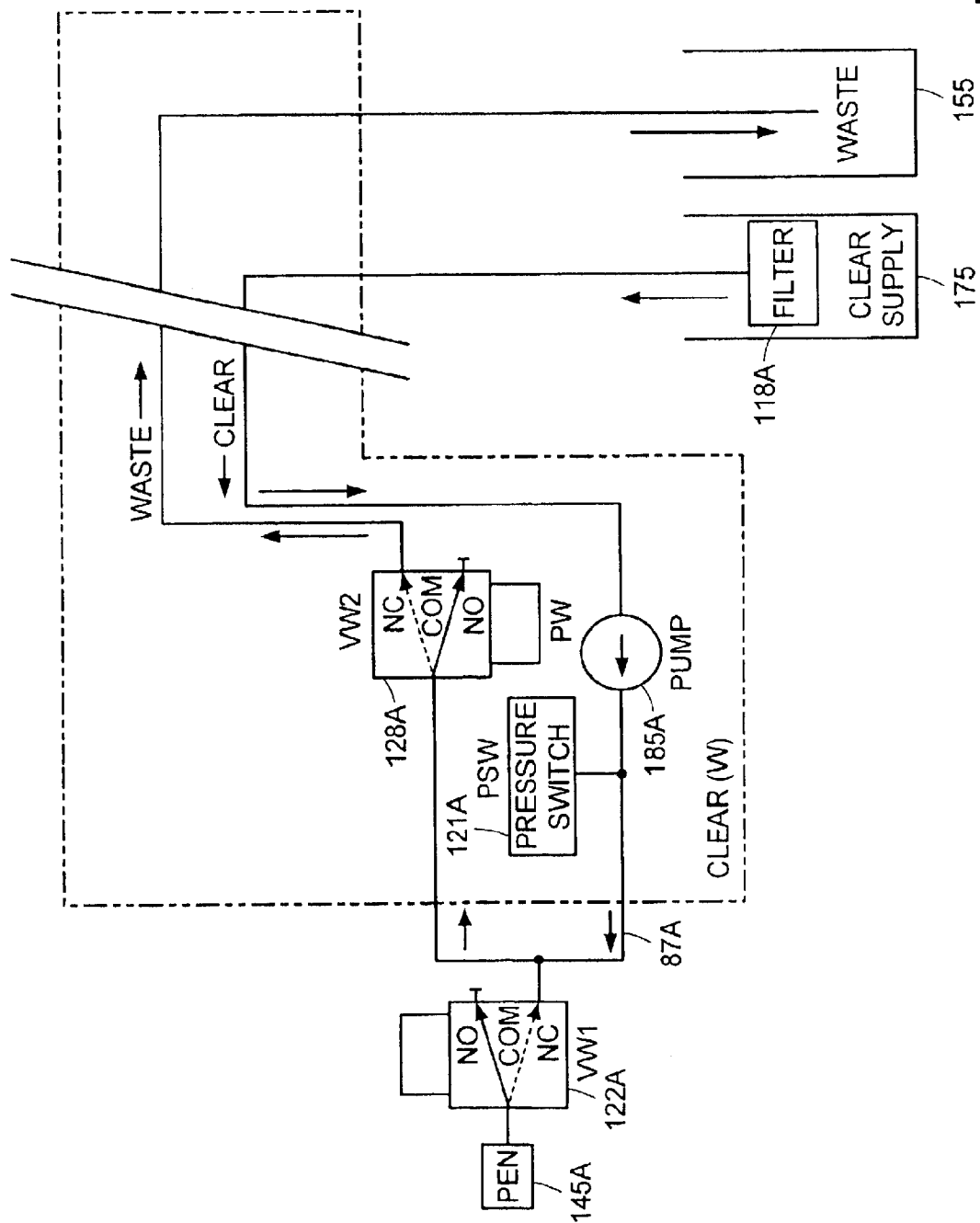
FIG. 11B is a detail of FIG. 11A showing the clear binder liquid portion.

FIG. 11B shows the binder liquid supply apparatus for printhead 145A of FIG. 11A, which is designated to print clear (colorless) binder liquid. In the usual operating mode, valve 122A is open to allow flow, and valve 128A is closed to block flow. A pump 185A draws clear binder liquid from its reservoir 175 through a filter 118A and supplies the liquid under pressure to printhead 145A through conduit 87A and valve 122A. A pressure switch 121A is configured to inhibit the action of the pump 185A whenever a preset pressure level (for example, 3 psi) has been reached. By this mechanism, the pressure of the clear binder liquid at the printhead 145A is maintained at approximately the preset pressure level.

In an alternative operating mode, the valve 128A is opened to allow flow, allowing binder liquid from the reservoir 175 to be circulated through the apparatus and returned to the waste receptacle 155. This configuration, for example allows the binder liquid in the apparatus to be refreshed periodically when the printer is idle for long intervals. In another alternative operating mode, the valve 122A is closed to block flow, for example to prevent the binder liquid in the printhead from draining back into the clear supply reservoir 175 when the printer is inactive.

Figure 11C:
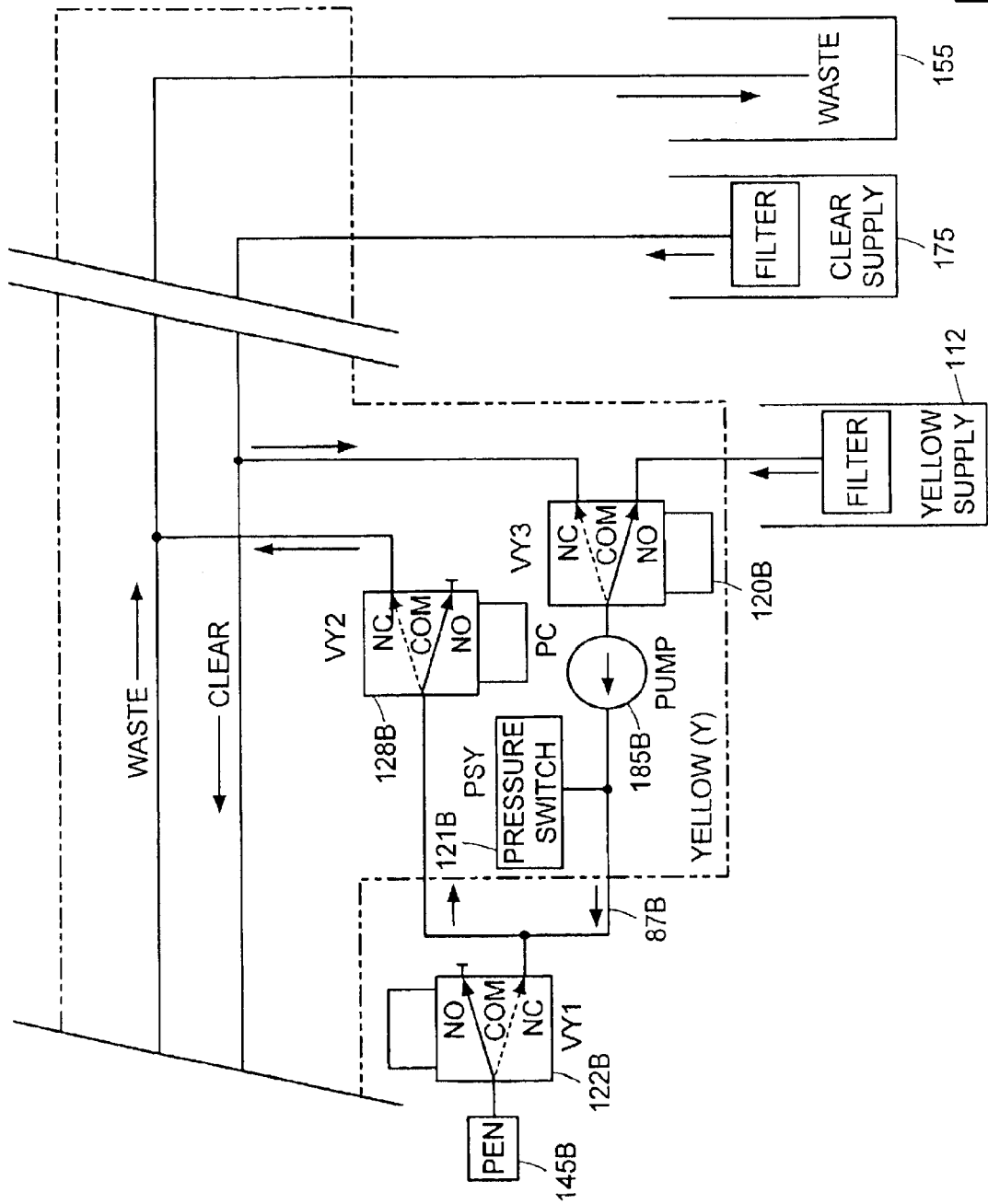
FIG. 11C is a detail of FIG. 11A showing the colored binder liquid portion.

FIG. 11C shows the binder liquid supply apparatus for a printhead 145B of FIG. 11A, which is designated to print yellow binder liquid. This apparatus differs from the clear binder supply apparatus shown in FIG. 11B by the addition of a valve 120B, which is configured to allow a pump 185B to draw binder liquid as required either from the clear supply reservoir 175 or from a yellow liquid reservoir 112. The other printheads 145C, 145D, in a manner identical to that described for the yellow printhead 145B, can be selectively supplied with either clear binder liquid or with colored binder liquid from the associated colored liquid reservoirs 114, 116.

In the apparatus described, valves 120B–120D can all be configured to supply clear binder to their respective printheads, for example to print a monochrome part at a high build rate. Alternatively, each head can be supplied with a different color to allow a colored part to be printed. When a change between color mode and monochrome mode is required, the valves 128B–128D can be opened to facilitate flushing of undesired binder liquid from the color head supply apparatus into the waste receptacle 155.

Equivalents

While the method and apparatus for prototyping a three-dimensional object has been particularly shown and described with references to particular embodiments thereof, it will be understood by those skilled in the art that various changes in form and details may be made without departing from the spirit and scope of the invention as defined by the appended claims. These and all other equivalents are intended to be encompassed by the following claims.

What is claimed is:

1. A method for depositing a binder liquid on build material at a particular location in a three-dimensional printer, comprising:
    determining a total amount of binder liquid to solidify the build material at the particular location;
    determining the amount of a colored binder liquid to produce a desired color at the particular location; and
    determining the amount of colorless binder liquid to be added to the colored binder liquid to obtain the total amount of binder liquid, the sum of all the binder liquids to be applied at the particular location, both colored and colorless, being made to equal a sufficient amount of total binder liquid to solidify the build material at the particular location of build material.

2. The method of claim 1 further comprising depositing the total amount of color binder liquid and colorless binder liquid at the particular location.

3. The method of claim 1 further comprising determining the amount of total binder liquid to bind the build material at the particular location of build material before any binder liquid is deposited on the build material.

4. The method of claim 1 further comprising programming software instructions for determining the contributions of colored binder liquid and colorless binder liquid to bind the build material at the particular location.

5. The method of claim 1 further comprising determining a second total amount of colored binder liquid and colorless binder liquid to bind the build material at another particular location in the three-dimensional printer.

6. The method of claim 5 wherein the second total amount of colored binder liquid and colorless binder liquid approximates a sufficient amount of total binder liquid to bind the build material at the another particular location of build material.

7. An apparatus for fabricating a three-dimensional object by depositing a sufficient amount of a binder liquid needed to solidify build material at a particular location in the apparatus, comprising:
    a build chamber that can be filled with the build material;
    a gantry mounted for displacement across the build chamber;
    at least one printhead mounted on the gantry for depositing a binder liquid on the build material;
    a first set of software instructions for determining a total amount of binder liquid solidify the build material at the particular location;
    a second set of software instructions for determining a contribution of a colored binder liquid at the particular location of the build material to produce a desired color at the particular location; and
    a third set of software instructions for determining the contribution of a colorless binder liquid to be added to the colored binder liquid at the particular location of the build material; and
    a fourth set of software instructions for controlling the printhead to deposit the total amount of the colored binder liquid and colorless binder liquid, the total amount of colored binder liquid and colorless binder liquid approximating the amount of total binder liquid sufficient to bind the build material at the particular location of build material.

8. The apparatus of claim 7 further comprising:
    a feed reservoir having stored therein a supply of build material for forming the object; and
    a vacuum pump coupled to the feed reservoir or to the build chamber to create an airflow through the feed reservoir or the build chamber, respectively.

9. The apparatus of claim 8 further comprising a switch that allows airflow through the feed reservoir or the build chamber.

10. The apparatus of claim 8 further comprising a valve that controls airflow through the build chamber during fabrication of the three-dimensional object, the valve being controlled by a controller.

11. A method of fabricating a three-dimensional object by depositing a predetermined amount of a binder liquid on build material at a particular location of the object, comprising:
    determining a contribution of a colored binder liquid at a particular location of the build material needed to produce the desired color at the particular location;
    determining a contribution of a colorless binder liquid at the particular location of the build material;
    determining the total amount of colored binder liquid and colorless binder liquid sufficient to solidify the build material at the particular location, the total amount of colored binder liquid and colorless binder liquid not exceeding the predetermined amount of binder liquid at the particular location of build material; and
    depositing the total amount of colored binder liquid and colorless binder liquid at the particular location.

12. An apparatus for fabricating a three-dimensional object comprising:
    a feed reservoir having stored therein a supply of build material for forming the object;
    a build chamber for receiving layers of the build material from the feed reservoir; and
    a vacuum pump coupled to the feed reservoir to create an airflow through the feed reservoir.

13. The apparatus of claim 12 wherein the vacuum pump is further coupled to the build chamber.

14. The apparatus of claim 13 further comprising a switch that selects airflow through the feed reservoir or the build chamber.

15. The apparatus of claim 14 further comprising a valve to control airflow through the build chamber during fabrication of the three-dimensional object, the valve being controlled by a controller responsive to the switch.

16. The apparatus of claim 15 wherein the controller includes software instructions.

17. The apparatus of claim 12 further comprising a plenum that supports the build material and allows airflow therethrough.

18. A method of fabricating a three-dimensional object comprising:
providing a feed reservoir having stored therein a supply of build material for forming the object;
providing a build chamber for receiving incremental layers of the build material from the feed reservoir;
providing an overflow cavity for receiving an excess quantity of build material transferred from the feed reservoir but not received by the build chamber; and
creating an airflow through the feed reservoir or the build chamber.

19. The method of claim 18 further comprising selectively creating an airflow through the feed reservoir or build chamber.

20. The method of claim 18 further comprising selectively creating an airflow through the build chamber during fabrication of the three-dimensional object.

21. The method of claim 18 further comprising supporting the build material by allowing airflow therethrough.

22. An apparatus for fabricating a three-dimensional object comprising:
a feed reservoir having stored therein a supply of build material for forming the object;
a build chamber for receiving layers of the build material from the feed reservoir; and
a vacuum pump coupled to the feed reservoir and to the build chamber to create an airflow through the feed reservoir or the build chamber in response to a switch.

23. The apparatus of claim 22 wherein the switch is configured to be controlled by a user of the apparatus.

24. The apparatus of claim 22 further comprising a valve that controls airflow through the build chamber during fabrication of the three-dimensional object, the valve being controlled by a controller responsive to the switch.

25. The apparatus of claim 24 wherein the valve is controlled by a controller that includes software instructions.

26. A method of printing a three-dimensional object, comprising:
depositing a first colored binder liquid on a bed of build material to form a first colored band along a first edge;
depositing a second colored binder liquid on the bed of build material to form a second colored band along a second edge; and
depositing colorless binder liquid on the bed of material between the first band and the second band.

27. The method of claim 26, wherein the colorless band forms a tapered band.

28. The method of claim 26, further comprising printing a higher concentration of the first colored binder liquid and a higher concentration of the second colored binder liquid at the tapered sections of the band.

29. A computer-readable medium storing software instructions that generate commands for controlling at least one printhead as it prints a substance including colorant on a bed of build material to form a multi-colored three-dimensional object, the software instructions including commands for printing the substance in bands extending from surfaces of the three-dimensional object into the object, the bands tapered at edges of the three-dimensional object to leave a non-colored section between adjacent bands.

30. The computer-readable medium of claim 29, wherein the software instructions further generate commands to print a higher concentration of colorant at the tapered sections of the bands.

31. A method for three-dimensional printing comprising the steps of:
with at least one printhead, depositing binder liquid onto a bed of build material to form sections of a three-dimensional object;
with at least one printhead, depositing a substance including colorant of a first color onto the bed of build material in a band extending from a first surface of the three-dimensional object into the object, wherein the band is tapered at an edge where the first surface meets an adjacent surface; and
with at least one printhead, depositing a substance including colorant of a second color onto the bed of build material in a band extending from the adjacent surface into the object, wherein the band is tapered at the edge where the adjacent surface meets the first surface to leave a non-colored section between the bands.

32. The method of claim 31, further comprising depositing the substances to form higher concentrations of colorant in the tapered sections of the bands relative to the remainder of the bands.

33. An apparatus for fabricating a three-dimensional object comprising:
a structural frame;
a build chamber supported by the frame, the build chamber being suited to be filled with a build material;
a gantry mounted for displacement across the build chamber,
at least one printhead mounted on the gantry; and
at least one cleaning element movable relative to the frame for cleaning the at least one printhead.

34. The apparatus of claim 33 wherein the cleaning element is mounted to a support element of a cleaning assembly.

35. The apparatus of claim 34 further comprising a deck supported by the frame, wherein the cleaning assembly further includes a device for raising and lowering the support element such that the at least one cleaning element extends above the deck in one position and extends below the deck in another position.

36. The apparatus of claim 33 wherein the cleaning element includes a squeegee.

37. The apparatus of claim 33 further comprising a nozzle that sprays the cleaning element with a liquid to clean the at least one cleaning element.

38. The apparatus of claim 37 wherein the nozzle sprays the cleaning element while the cleaning element is moving.

39. The apparatus of claim 37 wherein the liquid includes a binder liquid.

40. The apparatus of claim 37 wherein the liquid includes water mixed with polyethylene glycol.

41. The apparatus of claim 33, wherein the gantry is mounted for displacement across the build chamber along a slow axis, and further comprising at least four printheads mounted on the gantry for displacement along a fast axis, the printheads being offset to each other and further comprising at least four cleaning elements being offset along the fast axis to register with respective printheads.

42. A method for fabricating a three-dimensional object comprising:
providing a structural frame;
supporting a build chamber with the frame, the build chamber suited to be filled with a build material;
providing a gantry for displacement across the build chamber;

mounting at least one printhead mounted on the gantry; and mounting a moveable cleaning element relative to the frame for cleaning the at least one printhead.

43. The method of claim 42 further comprising moving the cleaning element above a deck supported by the frame to clean the at least one printhead.

44. The method of claim 43 further comprising moving the cleaning element below the deck after cleaning the at least one printhead.

45. The method of claim 44 further comprising spraying the cleaning element with a liquid to clean the cleaning element with the cleaning element below the deck.

46. The method of claim 45 further comprising spraying the cleaning element with a binder liquid.

47. The method of claim 45 further comprising spraying the cleaning element with water mixed with polyethylene glycol.

48. The method of claim 42, wherein the gantry is mounted for displacement across the build chamber along a slow axis, and further comprising at least four printheads mounted on the gantry for displacement along a fast axis, further comprising offsetting the printheads along the slow axis and farther comprising at least four cleaning elements aligned with respective printheads.

49. An apparatus for fabricating a three-dimensional object comprising:

a build chamber that can be filled with a build material;

a gantry mounted for displacement across the build chamber along a slow axis; and at least four printheads mounted on the gantry for displacement along a fast axis, the printheads being offset relative to each other.

50. The apparatus of claim 49, wherein the printheads print substances including colorants onto the build material.

51. The apparatus of claim 50, wherein the printheads are offset from adjacent printheads by a fixed distance along the slow axis, and the printheads are advanced step-wise along the slow axis by the fixed distance.

52. The apparatus of claim 50, wherein a binder liquid is mixed with the colorant before depositing on the build material.

53. The apparatus of claim 49, wherein colorless binder liquid is deposited by each of the printheads.

54. The apparatus of claim 53, wherein the printheads are offset from adjacent printheads by a fixed distance along the slow axis, and the printheads are advanced step-wise along the slow axis by a multiple of the fixed distance.

55. A method for three-dimensional printing comprising:

passing a plurality of printheads over a bed of build material along a fast axis, each of the printheads capable of depositing stripes as needed of a substance onto the build material in stripes, the stripes printed by the different printheads being offset from one another along a slow axis, which is substantially perpendicular to the fast axis; and advancing the plurality of printheads along the slow axis.

56. The method of claim 55, wherein the printheads print substances including colorants onto the build material.

57. The method of claim 56, wherein the printheads are offset from adjacent printheads by a fixed distance along the slow axis, and the printheads are advanced step-wise along the slow axis by the fixed distance.

58. The method of claim 56, further comprising mixing a binder liquid with the colorant before depositing on the build material.

59. The method of claim 55, wherein colorless binder liquid is deposited by each of the printheads.

60. The method of claim 59, wherein the printheads are offset from adjacent printheads by a fixed distance, and the printheads are advanced step-wise along the slow axis by a multiple of the fixed distance.

61. An apparatus for fabricating a three-dimensional object comprising:

a build chamber that can be filled with a bed of build material;

a plurality of printheads mounted for displacement across the build chamber, at least one binder source external to the printheads; and a plurality of conduits coupling each binder source with at least one printhead.

62. The apparatus of claim 61 wherein each binder source includes either a colorless binder liquid or a single colored binder liquid.

63. The apparatus of claim 62 wherein the colored binder liquid is formed by premixing a colorless binder liquid with a colorant outside the apparatus to form the colored binder liquid.

64. The apparatus of claim 62 wherein the colored binder liquid is formed by mixing a colorless binder liquid with a colorant inside the apparatus to form the colored binder liquid.

65. The apparatus of claim 62 wherein each binder source that includes a colored binder liquid includes a color distinct from that of other colored binder liquid.

66. The apparatus of claim 65 wherein the apparatus includes a first printhead coupled to the colorless binder liquid, a second printhead coupled to a cyan colored binder liquid, a third printhead coupled to a yellow colored binder liquid, and a fourth printhead coupled to a magenta colored binder liquid.

67. The apparatus of claim 66 further comprising a fifth printhead coupled to a black colored binder liquid.

68. The apparatus of claim 62, further comprising a gantry mounted for displacement across the build chamber along a slow axis, the printheads being aligned on the gantry in at least two rows extending parallel to a fast axis or slow axis.

69. The apparatus of claim 68, wherein printheads that are coupled with a colored binder liquid are paired in the same row with a printhead coupled with a colorless binder liquid.

70. The apparatus of claim 61, further comprising a gantry mounted for displacement across the build chamber along a slow axis, each of the printheads being positioned at a coordinate along the slow axis that is distinct from that of the other printheads.

71. The apparatus of claim 61, wherein the binder sources supply the binder liquid to each of the printheads by conduits, the conduits including circulation loops that allow the binder liquid to be circulated within the conduit.

72. The apparatus of claim 61, further comprising computer-readable memory storing software instructions for issuing commands to the printheads, wherein the software instructions generate commands that instruct the printheads to deliver the colored binder liquid in bands extending from a surface of the object into the object, the bands being tapered at an edge of the object to leave a non-colored section extending into the object from the edge.

73. The apparatus of claim 72, wherein the software instructions generate commands that instruct the printheads to print a higher concentration of the colored binder liquid at the tapered section of the band.

74. The apparatus of claim 61, further comprising computer-readable memory storing software instructions for issuing commands to the printheads and a gantry mounted for displacement across the build chamber along a slow axis, wherein the software instructions control the length of each advancement of the gantry along the slow axis as a function of whether the printheads are depositing the colored binder liquid, the software generating commands to advance the gantry a greater distance along the slow axis if all of the printheads are depositing a colorless binder liquid or if all of the printheads are printing colored binder liquid of the same color.

75. A method for fabricating a three-dimensional object comprising:
  providing a build chamber that can be filled with a bed of build material;
  mounting a plurality of printheads for displacement across the build chamber;
  providing at least one binder source external to the printheads; and
  coupling each binder source with at least one printhead through a plurality of conduits.

76. The method of claim 75 wherein each binder source includes either a colorless binder liquid or a single colored binder liquid.

77. The method of claim 76 further comprising premixing a colorless binder liquid with a colorant to form the colored binder outside the apparatus.

78. The method of claim 76 further comprising mixing a colorless binder liquid with a colorant inside the apparatus to form the colored binder liquid.

79. The method of claim 76 wherein each binder source that includes a colored binder liquid includes a color distinct from that of other colored binder liquid.

80. The method of claim 79 further comprising coupling a first printhead to the colorless binder liquid, coupling a second printhead to a cyan colored binder liquid, coupling a third printhead to a yellow colored binder liquid, and coupling a fourth printhead to a magenta colored binder liquid.

81. The method of claim 80 further comprising coupling a fifth printhead to a black colored binder liquid.

82. The method of claim 76, further comprising mounting a gantry for displacement across the build chamber along a slow axis, the printheads being aligned on the gantry in at least two rows extending parallel to a fast axis or slow axis.

83. The method of claim 82, wherein printheads that are coupled with a colored binder liquid are paired in the same row with a printhead coupled with a colorless binder liquid.

84. The method of claim 75, further comprising mounting a gantry for displacement across the build chamber along a slow axis, each of the printheads being positioned at a coordinate along the slow axis that is distinct from that of the other printheads.

85. The method of claim 75, wherein the binder sources supply the binder liquid to each of the printheads by conduits, the conduits including circulation loops that allow the binder liquid to be circulated within the conduit.

86. The method of claim 75, further comprising delivering the colored binder liquid in bands extending from a surface of the object into the object, the bands being tapered at an edge of the object to leave a non-colored section extending into the object from the edge.

87. The method of claim 86, further comprising printing a higher concentration of the colored binder liquid at the tapered section of the band.

88. The method of claim 76, further comprising mounting a gantry for displacement across the build chamber along a slow axis, and controlling the length of each advancement of the gantry along the slow axis as a function of whether the printheads are depositing the colored binder liquid, the gantry advancing a greater distance along the slow axis if all of the printheads are depositing a colorless binder liquid or if all of the printheads are printing colored binder liquid of the same color.

89. An apparatus for fabricating a three-dimensional object comprising:
  a container for containing a binder liquid mixed with a colorant to create a colored binder liquid;
  a conduit for delivering the colored binder liquid to a printhead, the printhead depositing the colored binder liquid onto a bed of build material; and
  a circulation loop for circulating the colored binder liquid in the conduit.

90. The apparatus of claim 89, further comprising:
  a colorless binder liquid that is delivered to the conduit; and
  a valve for diverting the flow of colored binder liquid through the conduit to the printhead.

91. The apparatus of claim 90, further comprising a second circulation loop in the conduit for circulating the colorless binder liquid in the conduit.

92. The apparatus of claim 90, further comprising a valve for stopping the delivery of the colored binder liquid through the printhead and for allowing circulation of the colorless binder liquid through the circulation loop.

93. The apparatus of claim 92, wherein the valve stops the delivery of the colorless binder liquid through the printhead and allows circulation of the colored binder liquid through the circulation loop.

94. The apparatus of claim 89, further comprising a valve in the conduit which allows waste colored binder liquid to exit the conduit.

95. The apparatus of claim 90, further comprising a valve in the conduit which allows waste colorless binder liquid to exit the conduit.

96. A method for three-dimensional printing comprising the steps of:
  mixing a binder liquid with a colorant to create a colored binder liquid;
  delivering the colored binder liquid to a printhead with a conduit;
  depositing the colored binder liquid with the printhead onto a bed of build material; and
  circulating the colored binder liquid through a first circulation loop in the conduit.

97. The method of claim 96, further comprising delivering colorless binder liquid from an external binder liquid source to the conduit and using a valve to divert the flow of colored binder liquid through the conduit to the printhead.

98. The method of claim 97, further comprising circulating the colorless binder liquid through a second circulation loop in the conduit.

99. The method of claim 97, further comprising:
  stopping the delivery of the colored binder liquid through the printhead;
  circulating the colorless binder liquid through the circulation loop; and
  delivering the colorless binder liquid through the printhead.

100. The method of claim 97, further comprising:
  stopping the delivery of the colorless binder liquid through the printhead;
  circulating the colored binder liquid through the circulation loop; and then
  delivering the colored binder liquid through the printhead.

101. The method of claim 96, further comprising providing a valve in the conduit which allows waste colored binder liquid to exit the conduit.

102. The method of claim 97, further comprising providing a valve in the conduit which allows waste colorless binder liquid to exit the conduit.

103. An apparatus for fabricating a three-dimensional object comprising:
a frame;
a build chamber mounted to the frame and suited for being filled with a build material;
a chute defining an overflow cavity, the chute being positioned to receive overflow build material from the build chamber;
a removable collection chamber coupled with the chute to receive build material that passes through the chute.

104. The apparatus of claim 103, further comprising a blower coupled to the chute to enable the blower to draw air through the chute.

105. The apparatus of claim 104, wherein the removable collection chamber is positioned between the blower and the chute.

106. The apparatus of claim 103, further comprising a feed chamber mounted to the frame, the feed chamber suited for being filled with a supply of build material to be delivered to the build chamber.

107. The apparatus of claim 103, wherein the removable collection chamber is in the form of a bucket that can be used to pour the collected build material back into the feed chamber.

108. The apparatus of claim 107, wherein the bucket includes an extended lip to facilitate pouring of collected build material.

109. The apparatus of claim 103, further comprising an optical sensor for sensing when the removable collection chamber contains a predetermined amount of build material.

110. A method for reclaiming build material in a three-dimensional printer comprising the steps of:
filling a feed chamber with build material;
transporting the build material from the feed chamber to a build chamber;
printing binder liquid onto the build material in the build chamber,
removing excess build material to a collection chamber; and
returning the excess build material from the collection chamber to the feed chamber.

111. The method of claim 110, wherein the excess build material is returned to the feed chamber by removing the collection chamber and pouring the excess build material into the feed chamber.

112. The method of claim 110, wherein the excess material is transported from the build chamber through a chute into the collection chamber.

113. The method of claim 112, further comprising using a blower to draw air through the chute and into the collection chamber, the collection chamber being positioned upstream from the blower.

114. The method of claim 110, further comprising sensing, with an optical sensor, when the removable collection chamber contains a predetermined amount of build material.

115. An apparatus for fabricating a three-dimensional object comprising:
a feed reservoir having stored therein a supply of build material for forming the object;
a build chamber for receiving layers of the build material from the feed reservoir;
a vacuum pump coupled to the feed reservoir to create an airflow through the feed reservoir, and the vacuum pump is further coupled to the build chamber, and
a switch that selects airflow through the feed reservoir or the build chamber.

116. The apparatus of claim 115 further comprising a valve to control airflow through the build chamber during fabrication of the three-dimensional object, the valve being controlled by a controller responsive to the switch.

117. The apparatus of claim 116 wherein the controller includes software instructions.

118. The apparatus of claim 115 further comprising a plenum that supports the build material and allows airflow therethrough.

119. An apparatus for fabricating a three-dimensional object comprising:
a structural frame;
a build chamber supported by the frame, the build chamber being suited to be filled with a build material;
a gantry mounted for displacement across the build chamber;
at least one printhead mounted on the gantry;
at least one cleaning element movable relative to the frame for cleaning the at least one printhead; and
a nozzle that sprays the cleaning element with a liquid to clean the at least one cleaning element, wherein the liquid includes water mixed with polyethylene glycol.

120. The apparatus of claim 119 wherein the cleaning element is mounted to a support element of a cleaning assembly.

121. The apparatus of claim 120 further comprising a deck supported by the frame, wherein the cleaning assembly further includes a device for raising and lowering the support element such that the at least one cleaning element extends above the deck in one position and extends below the deck in another position.

122. The apparatus of claim 119 wherein the cleaning element includes a squeegee.

123. The apparatus of claim 119 wherein the nozzle sprays the cleaning element while the cleaning element is moving.

124. The apparatus of claim 119 wherein the liquid includes a binder liquid.

125. The apparatus of claim 119, wherein the gantry is mounted for displacement across the build chamber along a slow axis, and further comprising at least four printheads mounted on the gantry for displacement along a fast axis, the printheads being offset to each other and further comprising at least four cleaning elements being offset along the fast axis to register with respective printheads.

126. A method for fabricating a three-dimensional object comprising:
providing a structural frame;
supporting a build chamber with the frame, the build chamber suited to be filled with a build material;
providing a gantry for displacement across the build chamber;
mounting at least one printhead mounted on the gantry;
mounting a cleaning element for cleaning the at least one printhead; and
spraying the cleaning element with a liquid to clean the cleaning element with the cleaning element below the deck, wherein the liquid includes water mixed with polyethylene glycol.

127. The method of claim 126 further comprising moving the cleaning element above a deck supported by the frame to clean the at least one printhead.

128. The method of claim 127 further comprising moving the cleaning element below the deck after cleaning the at least one printhead.

129. The method of claim 126 further comprising spraying the cleaning element with a binder liquid.

130. The method of claim 126, wherein the gantry is mounted for displacement across the build chamber along a slow axis, and further comprising at least four printheads mounted on the gantry for displacement along a fast axis, further comprising offsetting the printheads along the slow axis and further comprising at least four cleaning elements aligned with respective printheads.

131. A method for fabricating a three-dimensional object comprising:
providing a build chamber that can be filled with a bed of build material;
mounting a plurality of printheads for displacement across the build chamber;
providing at least one binder source external to the printheads; and
coupling each binder source with at least one printhead through a plurality of conduits wherein the binder sources supply the binder liquid to each of the printheads by conduits, the conduits including circulation loops that allow the binder liquid to be circulated within the conduit.

132. The method of claim 131 wherein each binder source includes either a colorless binder liquid or a single colored binder liquid.

133. The method of claim 132 further comprising premixing a colorless binder liquid with a colorant to form the colored binder outside the apparatus.

134. The method of claim 132 further comprising mixing a colorless binder liquid with a colorant inside the apparatus to form the colored binder liquid.

135. The method of claim 132 wherein each binder source that includes a colored binder liquid includes a color distinct from that of other colored binder liquid.

136. The method of claim 135 further comprising coupling a first printhead to the colorless binder liquid, coupling a second printhead to a cyan colored binder liquid, coupling a third printhead to a yellow colored binder liquid, and coupling a fourth printhead to a magenta colored binder liquid.

137. The method of claim 136 further comprising coupling a fifth printhead to a black colored binder liquid.

138. The method of claim 132, further comprising mounting a gantry for displacement across the build chamber along a slow axis, the printheads being aligned on the gantry in at least two rows extending parallel to a fast axis or slow axis.

139. The method of claim 138, wherein printheads that are coupled with a colored binder liquid are paired in the same row with a printhead coupled with a colorless binder liquid.

140. The method of claim 131, further comprising mounting a gantry for displacement across the build chamber along a slow axis, each of the printheads being positioned at a coordinate along the slow axis that is distinct from that of the other printheads.

141. The method of claim 131, further comprising delivering the colored binder liquid in bands extending from a surface of the object into the object, the bands being tapered at an edge of the object to leave a non-colored section extending into the object from the edge.

142. The method of claim 141, further comprising printing a higher concentration of the colored binder liquid at the tapered section of the band.

143. The method of claim 132, further comprising mounting a gantry for displacement across the build chamber along a slow axis, and controlling the length of each advancement of the gantry along the slow axis as a function of whether the printheads are depositing the colored binder liquid, the gantry advancing a greater distance along the slow axis if all of the printheads are depositing a colorless binder liquid or if all of the printheads are printing colored binder liquid of the same color.

* * * * *